US010903892B2

(12) United States Patent
Kang et al.

(10) Patent No.: US 10,903,892 B2
(45) Date of Patent: Jan. 26, 2021

(54) METHOD FOR PERFORMING UPLINK TRANSMISSION IN WIRELESS COMMUNICATION SYSTEM AND APPARATUS THEREFOR

(71) Applicant: LG ELECTRONICS INC., Seoul (KR)

(72) Inventors: Jiwon Kang, Seoul (KR); Suckchel Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/785,297

(22) Filed: Feb. 7, 2020

(65) Prior Publication Data

US 2020/0177266 A1   Jun. 4, 2020

Related U.S. Application Data

(63) Continuation of application No. PCT/KR2019/010710, filed on Aug. 22, 2019.
(Continued)

(30) Foreign Application Priority Data

Aug. 30, 2018 (KR) .................. 10-2018-0102807

(51) Int. Cl.
*H04B 7/08* (2006.01)
*H04W 76/27* (2018.01)
(Continued)

(52) U.S. Cl.
CPC ........... *H04B 7/088* (2013.01); *H04L 1/1819* (2013.01); *H04L 5/0051* (2013.01);
(Continued)

(58) Field of Classification Search
None
See application file for complete search history.

(56) References Cited

U.S. PATENT DOCUMENTS

2018/0279379 A1* 9/2018 Tsai .................. H04L 5/0048
2018/0324865 A1* 11/2018 Hui .................... H04W 74/004
(Continued)

OTHER PUBLICATIONS

CATT, "Remaining details on beam management," R1-1720182, 3GPP TSG RAN WG1 Meeting 91, dated Nov. 27-Dec. 1, 2017, 11 pages.
Huawei, HiSilicon, "Remaining issues on beam management and beam failure recovery," R1-1808145, 3GPP TSG RAN WG1 Meeting #94, Gothenburg, Sweden, Aug. 20-24, 2018, 5 pages.
(Continued)

*Primary Examiner* — Hassan A Phillips
*Assistant Examiner* — Gautam Sharma
(74) *Attorney, Agent, or Firm* — Fish & Richardson P.C.

(57) ABSTRACT

Disclosed herein is a method of performing uplink (UL) transmission in a wireless communication system, including receiving, by a user equipment (UE), configuration information on beam failure detection and beam failure recovery from a base station (BS) through RRC signaling, receiving a reference signal (RS) from the BS, transmitting, to the BS, a physical random access channel (PRACH) for a beam failure recovery request (BFRQ) related with a new beam RS having a reception quality equal to or greater than a predetermined threshold based on the configuration information, if a beam failure for the RS is detected, receiving, from the BS, downlink control information (DCI) for the PRACH, wherein the DCI is received in a beam failure recovery (BFR) search space in which a response for the PRACH is searched, and performing UL transmission, to the BS, based on the DCI, wherein the UL transmission is performed using the same spatial filter as a spatial filter used for transmission of the PRACH.

19 Claims, 17 Drawing Sheets

Related U.S. Application Data

(60) Provisional application No. 62/720,938, filed on Aug. 22, 2018.

(51) Int. Cl.

| | | |
|---|---|---|
| *H04L 1/18* | (2006.01) | |
| *H04L 5/00* | (2006.01) | |
| *H04L 25/02* | (2006.01) | |
| *H04W 72/04* | (2009.01) | |
| *H04W 74/02* | (2009.01) | |
| *H04W 74/08* | (2009.01) | |

(52) U.S. Cl.
  CPC .......... *H04L 5/0055* (2013.01); *H04L 5/0092* (2013.01); *H04L 25/0226* (2013.01); *H04W 72/042* (2013.01); *H04W 74/02* (2013.01); *H04W 74/0833* (2013.01); *H04W 76/27* (2018.02)

(56) References Cited

U.S. PATENT DOCUMENTS

| | | | | |
|---|---|---|---|---|
| 2018/0367374 | A1* | 12/2018 | Liu | H04L 5/0053 |
| 2018/0368009 | A1* | 12/2018 | Xia | H04W 24/04 |
| 2019/0053288 | A1* | 2/2019 | Zhou | H04B 7/0695 |
| 2019/0053294 | A1* | 2/2019 | Xia | H04B 7/088 |
| 2019/0058519 | A1* | 2/2019 | Davydov | H04L 5/0053 |
| 2019/0074882 | A1* | 3/2019 | Zhou | H04L 5/0098 |

OTHER PUBLICATIONS

Intel Corporation, "Remaining Issues on Beam Failure Recovery," R1-1806508, 3GPP TSG RAN WG1 Meeting #93, Busan, Korea, dated May 21-25, 2018, 4 pages.

Nokia, Nokia Shanghai Bell, "Remaining issues on beam management," R1-1809237, 3GPP TSG RAN WG1 Meeting #94, R1-1809237, Gothenburg, Sweden, dated Aug. 20-Aug. 24, 2018, 12 pages.

OPPO, "Text proposals for beam management," R1-1808886, 3GPP TSG RAN WG1 Meeting #94, Gothenburg, Sweden, Aug. 20-24, 2018, 7 pages.

Qualcomm, "Beam failure recovery procedure," R1-1804788, 3GPP TSG-RAN WG1 #92b, Sanya, China, dated Apr. 16-20, 2018, 10 pages.

Sony, "Remaining issues on beam management and beam failure recovery," R1-1808330, 3GPP TSG-RAN WG1 #94, Gothenburg, Sweden, Aug. 20-24, 2018, 6 pages.

ZTE, "Discussion on mechanism to recovery from beam failure," R1-1712300, 3GPP TSG RAN WG1 Meeting #90, Prague, Czechia, dated Aug. 21-25, 2017, 9 pages.

ZTE, Sanechips, "Discussion on beam recovery," R1-1719534, 3GPP TSG RAN WG1 Meeting #91, Reno, USA, dated Nov. 27-Dec. 1, 2017, 9 pages.

Extended European Search Report in European Appln. No. 19817916.0, dated Jul. 28, 2020, 9 pages.

Media Tek Inc., "Remaining Issues for Beam Management and Beam Failure Recovery," R1-1808264, 3GPP TSG RAN WG1 Meeting #94, Gothenburg, Sweden, Aug. 20-24, 2018, 7 pages.

\* cited by examiner (a)

(b)

(a)

(b)

METHOD FOR PERFORMING UPLINK TRANSMISSION IN WIRELESS COMMUNICATION SYSTEM AND APPARATUS THEREFOR

CROSS-REFERENCE TO RELATED APPLICATIONS

This application is continuation of International Application No. PCT/KR2019/010710, filed on Aug. 22, 2019, which claims the benefit of U.S. Provisional Application No. 62/720,938, filed on Aug. 22, 2018, KR Provisional Application No. 10-2018-0102807, filed on Aug. 30, 2018, the contents of which are all hereby incorporated by reference herein in their entirety.

TECHNICAL FIELD

The present disclosure relates to a wireless communication system, and more particularly, to a method for performing uplink transmission and an apparatus supporting the same.

BACKGROUND ART

A mobile communication system has been developed to provide a voice service while ensuring an activity of a user. However, in the mobile communication system, not only a voice but also a data service is extended. At present, due to an explosive increase in traffic, there is a shortage of resources and users demand a higher speed service, and as a result, a more developed mobile communication system is required.

Requirements of a next-generation mobile communication system should be able to support acceptance of explosive data traffic, a dramatic increase in per-user data rate, acceptance of a significant increase in the number of connected devices, very low end-to-end latency, and high-energy efficiency. To this end, various technologies are researched, which include dual connectivity, massive multiple input multiple output (MIMO), in-band full duplex, non-orthogonal multiple access (NOMA), super wideband support, device networking, and the like.

DISCLOSURE

Technical Problem

An embodiment of the present disclosure provides a method for determining a beam used for performing uplink transmission.

Another embodiment of the present disclosure provides a method for determining a beam used for performing uplink transmission after PRACH transmission.

The technical problems to be achieved by the present disclosure are not limited to the above-mentioned technical problems and any other technical problems that are not mentioned may be clearly understood by those skilled in the art to which the present disclosure pertains from the following descriptions.

Technical Solution

In an aspect, a method of performing uplink (UL) transmission in a wireless communication system is provided.

Specifically, the method performed by a user equipment (UE) includes: receiving, from a base station (BS), configuration information on beam failure detection and beam failure recovery through RRC signaling; receiving a reference signal (RS) from the BS; transmitting, to the BS, a physical random access channel (PRACH) for a beam failure recovery request (BFRQ) related with a new beam RS having a reception quality equal to or greater than a predetermined threshold based on the configuration information, if a beam failure for the RS is detected; receiving, from the BS, downlink control information (DCI) for the PRACH, the DCI being received in a beam failure recovery (BFR) search space in which a response for the PRACH is searched; and performing UL transmission, to the BS, based on the DCI, wherein the UL transmission is performed using the same spatial filter as a spatial filter used for transmission of the PRACH.

Furthermore, in this disclosure, the UL transmission may be performed on the same component carrier (CC) or the same bandwidth part (BWP) as a CC or a BWP that transmits the PRACH.

Furthermore, in this disclosure, the transmitting of the PRACH to the BS may include: counting the number of times of a beam failure for the RS received at least once, the number of times being a number when reception quality of the RS received at least once is equal to or lower than a predetermined reference value; and transmitting a PRACH for a BFRQ related with a new beam RS having a reception quality equal to or higher than a predetermined threshold based on the configuration information, if the number of times of beam failure is equal to or greater than a predetermined value.

Furthermore, in this disclosure, the uplink may be a PUCCH transmitted using some of a plurality of predetermined resources, and the some resources may be configured based on capability of the UE or configured by indication information received from the BS.

Furthermore, in this disclosure, the DCI may include a sounding reference signal (SRS) trigger request.

Furthermore, in this disclosure, the uplink may be a physical uplink control channel (PUCCH) including HARQ-ACK/NACK information on the DCI.

Furthermore, in this disclosure, a format of the DCI may be a DCI format 1_0, or a DCI format 1_1.

Furthermore, in this disclosure, the uplink may be a physical uplink shared channel (PUSCH).

Furthermore, in this disclosure, a format of the DCI may be DCI format 0_0 or DCI format 0_1.

Furthermore, in this disclosure, a user equipment performing uplink (UL) transmission in a wireless communication system includes: a radio frequency (RF) module transmitting and receiving a radio signal; and a processor functionally connected to the RF module, wherein the processor receives, from a base station (BS), configuration information on beam failure detection and beam failure recovery through RRC signaling, receives a reference signal (RS) from the BS; transmits, to the BS, a physical random access channel (PRACH) for a beam failure recovery request (BFRQ) related with a new beam RS having a reception quality equal to or greater than a predetermined threshold based on the configuration information, if a beam failure for the RS is detected; receives, from the BS, downlink control information (DCI) for the PRACH, the DCI being received in a beam failure recovery (BFR) search space in which a response for the PRACH is searched, and performs UL transmission, to the BS, based on the DCI, wherein the UL transmission is performed using the same spatial filter as a spatial filter used for transmission of the PRACH.

Furthermore, in this disclosure, the UL transmission is performed on the same component carrier (CC) or the same bandwidth part (BWP) as a CC or BWP that transmits the PRACH.

Furthermore, in this disclosure, the processor may count the number of times of a beam failure for the RS received at least once, the number of times being a number when reception quality of the RS received at least once is equal to or lower than a predetermined reference value, and the processor may transmit a PRACH for a BFRQ related with a new beam RS having a reception quality equal to or higher than a predetermined threshold, if the number of times of beam failure is equal to or greater than a predetermined value.

Furthermore, in this disclosure, the uplink may be a PUCCH transmitted using some of a plurality of predetermined resources, and the some resources may be configured based on the capability of the UE or configured by indication information received from the BS.

Furthermore, in this disclosure, the DCI may include a sounding reference signal (SRS) trigger request.

Furthermore, in this disclosure, the uplink may be a physical uplink control channel (PUCCH) including HARQ-ACK/NACK information on the DCI.

Furthermore, in this disclosure, a format of the DCI may be a DCI format 1_0, or a DCI format 1_1.

Furthermore, in this disclosure, the uplink may be a physical uplink shared channel (PUSCH).

Furthermore, in this disclosure, a format of the DCI may be DCI format 0_0 or DCI format 0_1.

Furthermore, in this disclosure, a method of performing uplink (UL) reception in a wireless communication system, the method being performed by a base station (BS) includes: transmitting configuration information on beam failure detection and beam failure recovery to a user equipment (UE); transmitting, to the UE, a reference signal (RS); receiving, from the UE, a physical random access channel (PRACH) for a beam failure recovery request (BFRQ) related with a new beam RS having a reception quality equal to or greater than a predetermined threshold based on the configuration information, if beam failure for the RS is detected; transmitting, to the UE, downlink control information (DCI) for the PRACH, the DCI is transmitted in a beam failure recovery (BFR) search space in which a response for the PRACH is searched; and performing UL reception, from the UE, based on the DCI, wherein the UL reception is performed using the same spatial filter as a spatial filter used for transmission of the PRACH.

Advantageous Effects

The present disclosure has an advantage in that an uplink transmission is efficiently performed by providing a method for setting a beam used for uplink transmission.

Furthermore, the present disclosure has an advantage in that transmission is efficiently performed by providing a method for setting a beam for transmission of a PUCCH or a PUSCH transmitted after a beam failure.

It will be appreciated by persons skilled in the art that that the effects that could be achieved with the present disclosure are not limited to what has been particularly described hereinabove and other advantages of the present disclosure will be more clearly understood by a person skilled in the art to which the present disclosure pertains, from the following detailed description

DESCRIPTION OF DRAWINGS

The accompany drawings, which are included as part of the detailed description in order to help understanding of the present disclosure, provide embodiments of the present disclosure and describe the technical characteristics of the present disclosure along with the detailed description.

MODE FOR INVENTION

Figure 1:
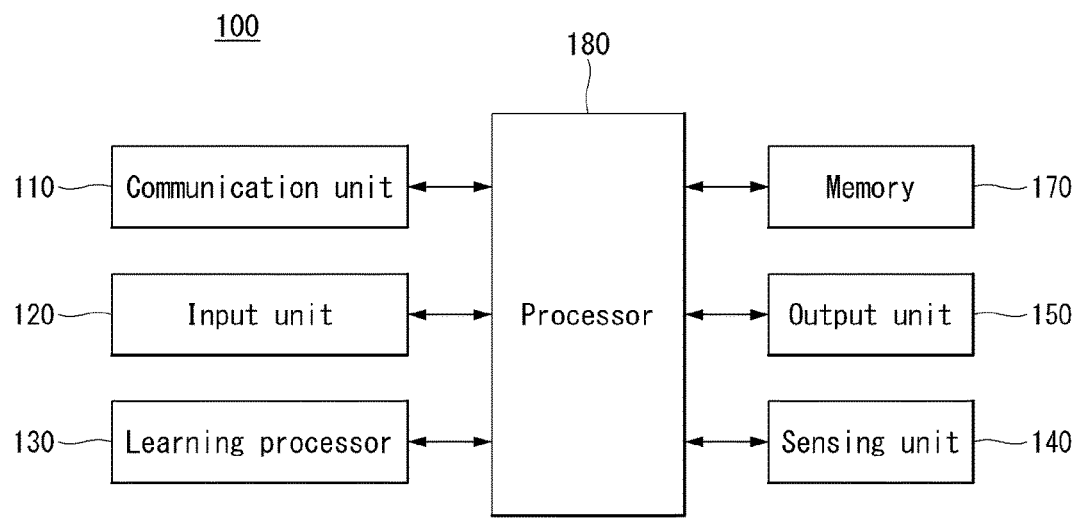
FIG. 1 is a diagram showing an AI device to which a method proposed in this specification may be applied.

Reference will now be made in detail to embodiments of the invention, examples of which are illustrated in the accompanying drawings. A detailed description to be disclosed below together with the accompanying drawing is to describe exemplary embodiments of the present disclosure and not to describe a unique embodiment for carrying out the present disclosure. The detailed description below includes details to provide a complete understanding of the present disclosure. However, those skilled in the art know that the present disclosure can be carried out without the details.

In some cases, in order to prevent a concept of the present disclosure from being ambiguous, known structures and devices may be omitted or illustrated in a block diagram format based on core functions of each structure and device.

In the present disclosure, a base station (BS) means a terminal node of a network directly performing communication with a terminal. In the present disclosure, specific operations described to be performed by the base station may be performed by an upper node of the base station, if necessary or desired. That is, it is obvious that in the network consisting of multiple network nodes including the base station, various operations performed for communication with the terminal can be performed by the base station or network nodes other than the base station. The 'base station (BS)' may be replaced with terms such as a fixed station, Node B, evolved-NodeB (eNB), a base transceiver system (BTS), an access point (AP), gNB (general NB), and the like. Further, a 'terminal' may be fixed or movable and may be replaced with terms such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-machine (M2M) device, a device-to-device (D2D) device, and the like.

In the present disclosure, downlink (DL) means communication from the base station to the terminal, and uplink (UL) means communication from the terminal to the base station. In the downlink, a transmitter may be a part of the base station, and a receiver may be a part of the terminal. In the uplink, the transmitter may be a part of the terminal, and the receiver may be a part of the base station.

Specific terms used in the following description are provided to help the understanding of the present disclosure, and may be changed to other forms within the scope without departing from the technical spirit of the present disclosure.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology such as universal terrestrial radio access (UTRA) or CDMA2000. The TDMA may be implemented by radio technology such as global system for mobile communications (GSM)/general packet radio service (GPRS)/enhanced data rates for GSM evolution (EDGE). The OFDMA may be implemented as radio technology such as IEEE 802.11 (Wi-Fi), IEEE 802.16 (WiMAX), IEEE 802-20, E-UTRA (evolved UTRA), and the like. The UTRA is a part of a universal mobile telecommunication system (UMTS). 3rd generation partnership project (3GPP) long term evolution (LTE), as a part of an evolved UMTS (E-UMTS) using E-UTRA, adopts the OFDMA in the downlink and the SC-FDMA in the uplink. LTE-A (advanced) is the evolution of 3GPP LTE.

Further, 5G new radio (NR) defines enhanced mobile broadband (eMBB), massive machine type communications (mMTC), ultra-reliable and low latency communications (URLLC), and vehicle-to-everything (V2X) based on usage scenario.

A 5G NR standard is divided into standalone (SA) and non-standalone (NSA) depending on co-existence between a NR system and a LTE system.

The 5G NR supports various subcarrier spacings and supports CP-OFDM in the downlink and CP-OFDM and DFT-s-OFDM (SC-OFDM) in the uplink.

Embodiments of the present disclosure can be supported by standard documents disclosed in at least one of IEEE 802, 3GPP, and 3GPP2 which are the wireless access systems. That is, steps or parts in embodiments of the present disclosure which are not described to clearly show the technical spirit of the present disclosure can be supported by the standard documents. Further, all terms described in the present disclosure can be described by the standard document.

3GPP LTE/LTE-A/New RAT (NR) is primarily described for clear description, but technical features of the present disclosure are not limited thereto.

In the present specification, 'A and/or B' may be interpreted in the same sense as 'including at least one of A or B'.

Hereinafter, examples of 5G use scenarios to which a method proposed in this specification may be applied are described.

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billions. The industry IoT is one of areas in which 5G performs major roles enabling smart city, asset tracking, smart utility, agriculture and security infra.

URLLC includes a new service which will change the industry through remote control of major infra and a link having ultra reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of mega bits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver can drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system can support remote treatment providing clinical treatment at a distant place. This helps to reduce a barrier for the distance and can improve access to medical services which are not continuously used at remote farming areas. Furthermore, this is used to save life in important treatment and an emergency condition. A radio sensor network based on mobile communication can provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

Artificial Intelligence (AI)

Artificial intelligence means the field in which artificial intelligence or methodology capable of producing artificial intelligence is researched. Machine learning means the field in which various problems handled in the artificial intelligence field are defined and methodology for solving the problems are researched. Machine learning is also defined as an algorithm for improving performance of a task through continuous experiences for the task.

An artificial neural network (ANN) is a model used in machine learning, and is configured with artificial neurons (nodes) forming a network through a combination of synapses, and may mean the entire model having a problem-solving ability. The artificial neural network may be defined by a connection pattern between the neurons of different layers, a learning process of updating a model parameter, and an activation function for generating an output value.

The artificial neural network may include an input layer, an output layer, and optionally one or more hidden layers. Each layer includes one or more neurons. The artificial neural network may include a synapse connecting neurons. In the artificial neural network, each neuron may output a function value of an activation function for input signals, weight, and a bias input through a synapse.

A model parameter means a parameter determined through learning, and includes the weight of a synapse connection and the bias of a neuron. Furthermore, a hyper parameter means a parameter that needs to be configured prior to learning in the machine learning algorithm, and includes a learning rate, the number of times of repetitions, a mini-deployment size, and an initialization function.

An object of learning of the artificial neural network may be considered to determine a model parameter that minimizes a loss function. The loss function may be used as an index for determining an optimal model parameter in the learning process of an artificial neural network.

Machine learning may be classified into supervised learning, unsupervised learning, and reinforcement learning based on a learning method.

Supervised learning means a method of training an artificial neural network in the state in which a label for learning data has been given. The label may mean an answer (or a result value) that must be deduced by an artificial neural network when learning data is input to the artificial neural network. Unsupervised learning may mean a method of training an artificial neural network in the state in which a label for learning data has not been given. Reinforcement learning may mean a learning method in which an agent defined within an environment is trained to select a behavior or behavior sequence that maximizes accumulated compensation in each state.

Machine learning implemented as a deep neural network (DNN) including a plurality of hidden layers, among artificial neural networks, is also called deep learning. Deep learning is part of machine learning. Hereinafter, machine learning is used as a meaning including deep learning.

Robot

A robot may mean a machine that automatically processes a given task or operates based on an autonomously owned ability. Particularly, a robot having a function for recognizing an environment and autonomously determining and performing an operation may be called an intelligence type robot.

A robot may be classified for industry, medical treatment, home, and military based on its use purpose or field.

A robot includes a driving unit including an actuator or motor, and may perform various physical operations, such as moving a robot joint. Furthermore, a movable robot includes a wheel, a brake, a propeller, etc. in a driving unit, and may run on the ground or fly in the air through the driving unit.

Self-Driving (Autonomous-Driving)

Self-driving means a technology for autonomous driving. A self-driving vehicle means a vehicle that runs without a user manipulation or by a user's minimum manipulation.

For example, self-driving may include all of a technology for maintaining a driving lane, a technology for automatically controlling speed, such as adaptive cruise control, a technology for automatic driving along a predetermined path, a technology for automatically configuring a path when a destination is set and driving.

A vehicle includes all of a vehicle having only an internal combustion engine, a hybrid vehicle including both an internal combustion engine and an electric motor, and an electric vehicle having only an electric motor, and may include a train, a motorcycle, etc. in addition to the vehicles.

In this case, the self-driving vehicle may be considered to be a robot having a self-driving function.

Extended Reality (XR)

Extended reality collectively refers to virtual reality (VR), augmented reality (AR), and mixed reality (MR). The VR technology provides an object or background of the real world as a CG image only. The AR technology provides a virtually produced CG image on an actual thing image. The MR technology is a computer graphics technology for mixing and combining virtual objects with the real world and providing them.

The MR technology is similar to the AR technology in that it shows a real object and a virtual object. However, in the AR technology, a virtual object is used in a form to supplement a real object. In contrast, unlike in the AR technology, in the MR technology, a virtual object and a real object are used as the same character.

The XR technology may be applied to a head-mount display (HMD), a head-up display (HUD), a mobile phone, a tablet PC, a laptop, a desktop, TV, and a digital signage. A device to which the XR technology has been applied may be called an XR device.

FIG. 1 is a diagram showing an AI device 100 to which a method proposed in this specification may be applied.

The AI device 100 may be implemented as a fixed device or mobile device, such as TV, a projector, a mobile phone, a smartphone, a desktop computer, a notebook, a terminal for digital broadcasting, a personal digital assistants (PDA), a portable multimedia player (PMP), a navigator, a tablet PC, a wearable device, a set-top box (STB), a DMB receiver, a radio, a washing machine, a refrigerator, a desktop computer, a digital signage, a robot, and a vehicle.

Referring to FIG. 1, the terminal 100 may include a communication unit 110, an input unit 120, a learning processor 130, a sensing unit 140, an output unit 150, memory 170 and a processor 180.

The communication unit 110 may transmit and receive data to and from external devices, such as other AI devices 100a to 100er or an AI server 200, using wired and wireless communication technologies. For example, the communication unit 110 may transmit and receive sensor information, a user input, a learning model, and a control signal to and from external devices.

In this case, communication technologies used by the communication unit 110 include a global system for mobile communication (GSM), code division multi access (CDMA), long term evolution (LTE), 5G, a wireless LAN (WLAN), wireless-fidelity (Wi-Fi), Bluetooth™, radio frequency identification (RFID), infrared data association (IrDA), ZigBee, near field communication (NFC), etc.

The input unit 120 may obtain various types of data.

In this case, the input unit 120 may include a camera for an image signal input, a microphone for receiving an audio signal, a user input unit for receiving information from a user, etc. In this case, the camera or the microphone is treated as a sensor, and a signal obtained from the camera or the microphone may be called sensing data or sensor information.

The input unit 120 may obtain learning data for model learning and input data to be used when an output is obtained using a learning model. The input unit 120 may obtain not-processed input data. In this case, the processor 180 or the learning processor 130 may extract an input feature by performing pre-processing on the input data.

The learning processor 130 may be trained by a model configured with an artificial neural network using learning data. In this case, the trained artificial neural network may be called a learning model. The learning model is used to deduce a result value of new input data not learning data. The deduced value may be used as a base for performing a given operation.

In this case, the learning processor 130 may perform AI processing along with the learning processor 240 of the AI server 200.

In this case, the learning processor 130 may include memory integrated or implemented in the AI device 100. Alternatively, the learning processor 130 may be implemented using the memory 170, external memory directly coupled to the AI device 100 or memory maintained in an external device.

The sensing unit 140 may obtain at least one of internal information of the AI device 100, surrounding environment information of the AI device 100, or user information using various sensors.

In this case, sensors included in the sensing unit 140 include a proximity sensor, an illumination sensor, an acceleration sensor, a magnetic sensor, a gyro sensor, an inertia sensor, an RGB sensor, an IR sensor, a fingerprint recognition sensor, an ultrasonic sensor, a photo sensor, a microphone, LIDAR, and a radar.

The output unit 150 may generate an output related to a visual sense, an auditory sense or a tactile sense.

In this case, the output unit 150 may include a display unit for outputting visual information, a speaker for outputting auditory information, and a haptic module for outputting tactile information.

The memory 170 may store data supporting various functions of the AI device 100. For example, the memory 170 may store input data obtained by the input unit 120, learning data, a learning model, a learning history, etc.

The processor 180 may determine at least one executable operation of the AI device 100 based on information, determined or generated using a data analysis algorithm or a machine learning algorithm. Furthermore, the processor 180 may perform the determined operation by controlling elements of the AI device 100.

To this end, the processor 180 may request, search, receive, and use the data of the learning processor 130 or the memory 170, and may control elements of the AI device 100 to execute a predicted operation or an operation determined to be preferred, among the at least one executable operation.

In this case, if association with an external device is necessary to perform the determined operation, the processor 180 may generate a control signal for controlling the corresponding external device and transmit the generated control signal to the corresponding external device.

The processor 180 may obtain intention information for a user input and transmit user requirements based on the obtained intention information.

In this case, the processor 180 may obtain the intention information, corresponding to the user input, using at least one of a speech to text (STT) engine for converting a voice input into a text string or a natural language processing (NLP) engine for obtaining intention information of a natural language.

In this case, at least some of at least one of the STT engine or the NLP engine may be configured as an artificial neural network trained based on a machine learning algorithm. Furthermore, at least one of the STT engine or the NLP engine may have been trained by the learning processor 130, may have been trained by the learning processor 240 of the AI server 200 or may have been trained by distributed processing thereof.

The processor 180 may collect history information including the operation contents of the AI device 100 or the feedback of a user for an operation, may store the history information in the memory 170 or the learning processor 130, or may transmit the history information to an external device, such as the AI server 200. The collected history information may be used to update a learning model.

The processor 18 may control at least some of the elements of the AI device 100 in order to execute an application program stored in the memory 170. Moreover, the processor 180 may combine and drive two or more of the elements included in the AI device 100 in order to execute the application program.

Figure 2:
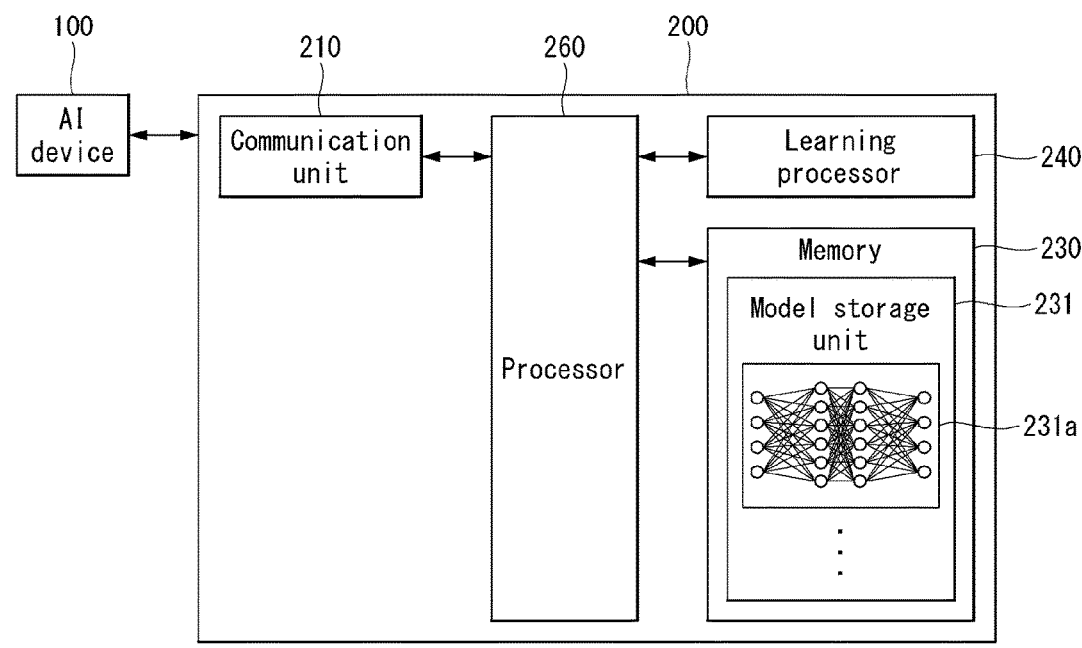
FIG. 2 is a diagram showing an AI server to which a method proposed in this specification may be applied.

FIG. 2 is a diagram showing the AI server 200 to which a method proposed in this specification may be applied.

Referring to FIG. 2, the AI server 200 may mean a device which is trained by an artificial neural network using a machine learning algorithm or which uses a trained artificial neural network. In this case, the AI server 200 is configured with a plurality of servers and may perform distributed processing and may be defined as a 5G network. In this case, the AI server 200 may be included as a partial configuration of the AI device 100, and may perform at least some of AI processing.

The AI server 200 may include a communication unit 210, memory 230, a learning processor 240 and a processor 260.

The communication unit 210 may transmit and receive data to and from an external device, such as the AI device 100.

The memory 230 may include a model storage unit 231. The model storage unit 231 may store a model (or artificial neural network 231a) which is being trained or has been trained through the learning processor 240.

The learning processor 240 may train the artificial neural network 231a using learning data. The learning model may be used in the state in which it has been mounted on the AI server 200 of the artificial neural network or may be mounted on an external device, such as the AI device 100, and used.

The learning model may be implemented as hardware, software or a combination of hardware and software. If some of or the entire learning model is implemented as software, one or more instructions configuring the learning model may be stored in the memory 230.

The processor 260 may deduce a result value of new input data using the learning model, and may generate a response or control command based on the deduced result value.

Figure 3:
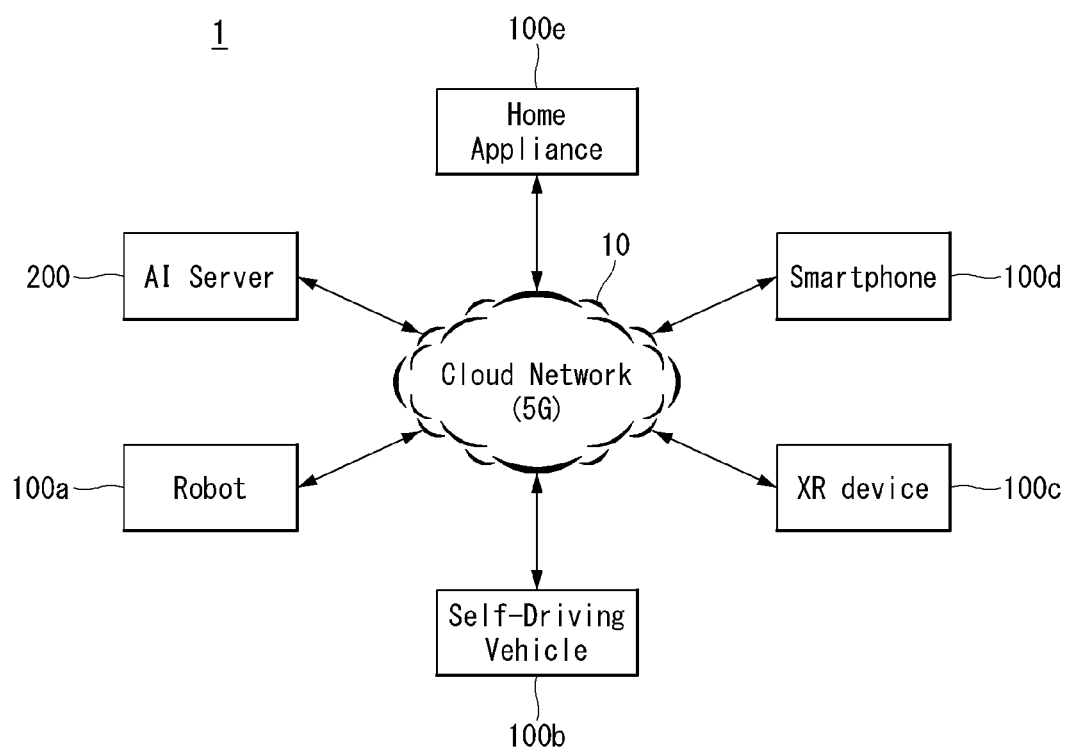
FIG. 3 is a diagram showing an AI system to which a method proposed in this specification may be applied.

FIG. 3 is a diagram showing an AI system 1 to which a method proposed in this specification may be applied.

Referring to FIG. 3, the AI system 1 is connected to at least one of the AI server 200, a robot 100a, a self-driving vehicle 100b, an XR device 100c, a smartphone 100d or home appliances 100e over a cloud network 10. In this case, the robot 100a, the self-driving vehicle 100b, the XR device 100c, the smartphone 100d or the home appliances 100e to which the AI technology has been applied may be called AI devices 100a to 100e.

The cloud network 10 may configure part of cloud computing infra or may mean a network present within cloud computing infra. In this case, the cloud network 10 may be configured using the 3G network, the 4G or long term evolution (LTE) network or the 5G network.

That is, the devices 100a to 100e (200) configuring the AI system 1 may be interconnected over the cloud network 10. Particularly, the devices 100a to 100e and 200 may communicate with each other through a base station, but may directly communicate with each other without the intervention of a base station.

The AI server 200 may include a server for performing AI processing and a server for performing calculation on big data.

The AI server 200 is connected to at least one of the robot 100a, the self-driving vehicle 100b, the XR device 100c, the smartphone 100d or the home appliances 100e, that is, AI devices configuring the AI system 1, over the cloud network 10, and may help at least some of the AI processing of the connected AI devices 100a to 100e.

In this case, the AI server 200 may train an artificial neural network based on a machine learning algorithm in place of the AI devices 100a to 100e, may directly store a learning model or may transmit the learning model to the AI devices 100a to 100e.

In this case, the AI server 200 may receive input data from the AI devices 100a to 100e, may deduce a result value of the received input data using the learning model, may generate a response or control command based on the deduced result value, and may transmit the response or control command to the AI devices 100a to 100e.

Alternatively, the AI devices 100a to 100e may directly deduce a result value of input data using a learning model, and may generate a response or control command based on the deduced result value.

Hereinafter, various embodiments of the AI devices 100a to 100e to which the above-described technology is applied are described. In this case, the AI devices 100a to 100e shown in FIG. 3 may be considered to be detailed embodiments of the AI device 100 shown in FIG. 1.

AI+Robot

An AI technology is applied to the robot 100a, and the robot 100a may be implemented as a guidance robot, a transport robot, a cleaning robot, a wearable robot, an entertainment robot, a pet robot, an unmanned flight robot, etc.

The robot 100a may include a robot control module for controlling an operation. The robot control module may mean a software module or a chip in which a software module has been implemented using hardware.

The robot 100a may obtain state information of the robot 100a, may detect (recognize) a surrounding environment and object, may generate map data, may determine a moving path and a running plan, may determine a response to a user interaction, or may determine an operation using sensor information obtained from various types of sensors.

In this case, the robot 100a may use sensor information obtained by at least one sensor among LIDAR, a radar, and a camera in order to determine the moving path and running plan.

The robot 100a may perform the above operations using a learning model configured with at least one artificial neural network. For example, the robot 100a may recognize a surrounding environment and object using a learning model, and may determine an operation using recognized surrounding environment information or object information. In this case, the learning model may have been directly trained in the robot 100a or may have been trained in an external device, such as the AI server 200.

In this case, the robot 100a may directly generate results using the learning model and perform an operation, but may perform an operation by transmitting sensor information to an external device, such as the AI server 200, and receiving results generated in response thereto.

The robot 100a may determine a moving path and running plan using at least one of map data, object information detected from sensor information, or object information obtained from an external device. The robot 100a may run along the determined moving path and running plan by controlling the driving unit.

The map data may include object identification information for various objects disposed in the space in which the robot 100a moves. For example, the map data may include object identification information for fixed objects, such as a wall and a door, and movable objects, such as a flowport and a desk. Furthermore, the object identification information may include a name, a type, a distance, a location, etc.

Furthermore, the robot 100a may perform an operation or run by controlling the driving unit based on a user's control/interaction. In this case, the robot 100a may obtain intention information of an interaction according to a user's behavior or voice speaking, may determine a response based on the obtained intention information, and may perform an operation.

AI+Self-Driving

An AI technology is applied to the self-driving vehicle 100b, and the self-driving vehicle 100b may be implemented as a movable type robot, a vehicle, an unmanned flight body, etc.

The self-driving vehicle 100b may include a self-driving control module for controlling a self-driving function. The self-driving control module may mean a software module or a chip in which a software module has been implemented using hardware. The self-driving control module may be included in the self-driving vehicle 100b as an element of the self-driving vehicle 100b, but may be configured as separate hardware outside the self-driving vehicle 100b and connected to the self-driving vehicle 100b.

The self-driving vehicle 100b may obtain state information of the self-driving vehicle 100b, may detect (recognize) a surrounding environment and object, may generate map data, may determine a moving path and running plan, or may determine an operation using sensor information obtained from various types of sensors.

In this case, in order to determine the moving path and running plan, like the robot 100a, the self-driving vehicle 100b may use sensor information obtained from at least one sensor among LIDAR, a radar and a camera.

Particularly, the self-driving vehicle 100b may recognize an environment or object in an area whose view is blocked or an area of a given distance or more by receiving sensor information for the environment or object from external devices, or may directly receive recognized information for the environment or object from external devices.

The self-driving vehicle 100b may perform the above operations using a learning model configured with at least one artificial neural network. For example, the self-driving vehicle 100b may recognize a surrounding environment and object using a learning model, and may determine the flow of running using recognized surrounding environment information or object information. In this case, the learning model may have been directly trained in the self-driving vehicle 100b or may have been trained in an external device, such as the AI server 200.

In this case, the self-driving vehicle 100b may directly generate results using the learning model and perform an operation, but may perform an operation by transmitting sensor information to an external device, such as the AI server 200, and receiving results generated in response thereto.

The self-driving vehicle 100b may determine a moving path and running plan using at least one of map data, object information detected from sensor information or object information obtained from an external device. The self-driving vehicle 100b may run based on the determined moving path and running plan by controlling the driving unit.

The map data may include object identification information for various objects disposed in the space (e.g., road) in which the self-driving vehicle 100b runs. For example, the map data may include object identification information for fixed objects, such as a streetlight, a rock, and a building, etc., and movable objects, such as a vehicle and a pedestrian. Furthermore, the object identification information may include a name, a type, a distance, a location, etc.

Furthermore, the self-driving vehicle 100b may perform an operation or may run by controlling the driving unit based on a user's control/interaction. In this case, the self-driving vehicle 100b may obtain intention information of an interaction according to a user' behavior or voice speaking, may determine a response based on the obtained intention information, and may perform an operation.

AI+XR

An AI technology is applied to the XR device 100c, and the XR device 100c may be implemented as a head-mount display, a head-up display provided in a vehicle, television, a mobile phone, a smartphone, a computer, a wearable device, home appliances, a digital signage, a vehicle, a fixed type robot or a movable type robot.

The XR device 100c may generate location data and attributes data for three-dimensional points by analyzing three-dimensional point cloud data or image data obtained through various sensors or from an external device, may obtain information on a surrounding space or real object based on the generated location data and attributes data, and may output an XR object by rendering the XR object. For example, the XR device 100c may output an XR object, including additional information for a recognized object, by making the XR object correspond to the corresponding recognized object.

The XR device 100c may perform the above operations using a learning model configured with at least one artificial neural network. For example, the XR device 100c may recognize a real object in three-dimensional point cloud data or image data using a learning model, and may provide information corresponding to the recognized real object. In this case, the learning model may have been directly trained in the XR device 100c or may have been trained in an external device, such as the AI server 200.

In this case, the XR device 100c may directly generate results using a learning model and perform an operation, but may perform an operation by transmitting sensor information to an external device, such as the AI server 200, and receiving results generated in response thereto.

AI+Robot+Self-Driving

An AI technology and a self-driving technology are applied to the robot 100a, and the robot 100a may be implemented as a guidance robot, a transport robot, a cleaning robot, a wearable robot, an entertainment robot, a pet robot, an unmanned flight robot, etc.

The robot 100a to which the AI technology and the self-driving technology have been applied may mean a robot itself having a self-driving function or may mean the robot 100a interacting with the self-driving vehicle 100b.

The robot 100a having the self-driving function may collectively refer to devices that autonomously move along a given flow without control of a user or autonomously determine a flow and move.

The robot 100a and the self-driving vehicle 100b having the self-driving function may use a common sensing method in order to determine one or more of a moving path or a running plan. For example, the robot 100a and the self-driving vehicle 100b having the self-driving function may determine one or more of a moving path or a running plan using information sensed through LIDAR, a radar, a camera, etc.

The robot 100a interacting with the self-driving vehicle 100b is present separately from the self-driving vehicle 100b, and may perform an operation associated with a self-driving function inside or outside the self-driving vehicle 100b or associated with a user got in the self-driving vehicle 100b.

In this case, the robot 100a interacting with the self-driving vehicle 100b may control or assist the self-driving function of the self-driving vehicle 100b by obtaining sensor information in place of the self-driving vehicle 100b and providing the sensor information to the self-driving vehicle 100b, or by obtaining sensor information, generating surrounding environment information or object information, and providing the surrounding environment information or object information to the self-driving vehicle 100b.

Alternatively, the robot 100a interacting with the self-driving vehicle 100b may control the function of the self-driving vehicle 100b by monitoring a user got in the self-driving vehicle 100b or through an interaction with a user. For example, if a driver is determined to be a drowsiness state, the robot 100a may activate the self-driving function of the self-driving vehicle 100b or assist control of the driving unit of the self-driving vehicle 100b. In this case, the function of the self-driving vehicle 100b controlled by the robot 100a may include a function provided by a navigation system or audio system provided within the self-driving vehicle 100b, in addition to a self-driving function simply.

Alternatively, the robot 100a interacting with the self-driving vehicle 100b may provide information to the self-driving vehicle 100b or may assist a function outside the self-driving vehicle 100b. For example, the robot 100a may provide the self-driving vehicle 100b with traffic information, including signal information, as in a smart traffic light, and may automatically connect an electric charger to a filling inlet through an interaction with the self-driving vehicle 100b as in the automatic electric charger of an electric vehicle.

AI+Robot+XR

An AI technology and an XR technology are applied to the robot 100a, and the robot 100a may be implemented as a guidance robot, a transport robot, a cleaning robot, a wearable robot, an entertainment robot, a pet robot, an unmanned flight robot, a drone, etc.

The robot 100a to which the XR technology has been applied may mean a robot, that is, a target of control/interaction within an XR image. In this case, the robot 100a is different from the XR device 100c, and they may operate in conjunction with each other.

When the robot 100a, that is, a target of control/interaction within an XR image, obtains sensor information from sensors including a camera, the robot 100a or the XR device 100c may generate an XR image based on the sensor information, and the XR device 100c may output the generated XR image. Furthermore, the robot 100a may operate based on a control signal received through the XR device 100c or a user's interaction.

For example, a user may identify a corresponding XR image at timing of the robot 100a, remotely operating in conjunction through an external device, such as the XR device 100c, may adjust the self-driving path of the robot 100a through an interaction, may control an operation or driving, or may identify information of a surrounding object.

AI+Self-Driving+XR

An AI technology and an XR technology are applied to the self-driving vehicle 100b, and the self-driving vehicle 100b may be implemented as a movable type robot, a vehicle, an unmanned flight body, etc.

The self-driving vehicle 100b to which the XR technology has been applied may mean a self-driving vehicle equipped with means for providing an XR image or a self-driving vehicle, that is, a target of control/interaction within an XR image. Particularly, the self-driving vehicle 100b, that is, a target of control/interaction within an XR image, is different from the XR device 100c, and they may operate in conjunction with each other.

The self-driving vehicle 100b equipped with the means for providing an XR image may obtain sensor information from sensors including a camera, and may output an XR image generated based on the obtained sensor information. For example, the self-driving vehicle 100b includes an HUD, and may provide a passenger with an XR object corresponding to a real object or an object within a screen by outputting an XR image.

In this case, when the XR object is output to the HUD, at least some of the XR object may be output with it overlapping a real object toward which a passenger's view is directed. In contrast, when the XR object is displayed on a display included within the self-driving vehicle 100b, at least some of the XR object may be output so that it overlaps an object within a screen. For example, the self-driving vehicle 100b may output XR objects corresponding to objects, such as a carriageway, another vehicle, a traffic light, a signpost, a two-wheeled vehicle, a pedestrian, and a building.

When the self-driving vehicle 100b, that is, a target of control/interaction within an XR image, obtains sensor information from sensors including a camera, the self-driving vehicle 100b or the XR device 100c may generate an XR image based on the sensor information. The XR device 100c may output the generated XR image. Furthermore, the self-driving vehicle 100b may operate based on a control signal received through an external device, such as the XR device 100c, or a user's interaction.

Definition of Terms eLTE eNB: The eLTE eNB is the evolution of eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network created by the operator customized to provide an optimized solution for a specific market scenario which demands specific requirements with end-to-end scope.

Network function: A network function is a logical node within a network infrastructure that has well-defined external interfaces and well-defined functional behaviour.

NG-C: A control plane interface used on NG2 reference points between new RAN and NGC.

NG-U: A user plane interface used on NG3 references points between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: A termination point of NG-U interface.

Numerology: The numerology corresponds to one subcarrier spacing in a frequency domain. By scaling a reference subcarrier spacing by an integer N, different numerologies can be defined.

NR: NR radio access or new radio.

General System

Figure 4:
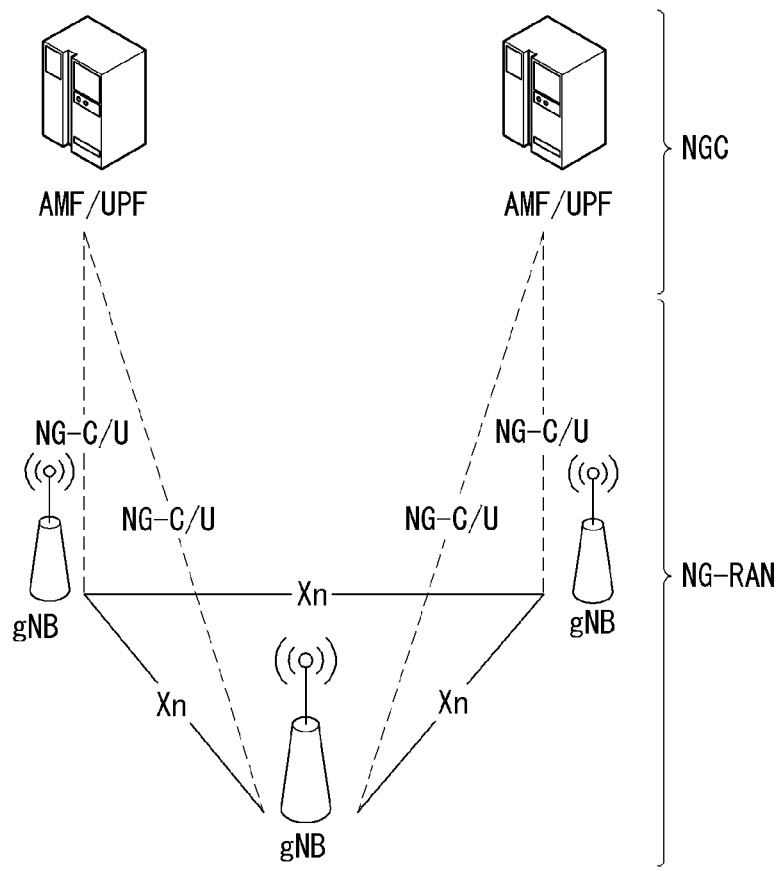
FIG. 4 is a diagram showing an example of a general system configuration of NR to which a method proposed in this specification may be applied.

FIG. 4 illustrates an example of an overall structure of a NR system to which a method proposed by the present specification is applicable.

Referring to FIG. 4, an NG-RAN is composed of gNBs that provide an NG-RA user plane (new AS sublayer/PDCP/RLC/MAC/PHY) and a control plane (RRC) protocol terminal for a UE (User Equipment).

The gNBs are connected to each other via an Xn interface.

The gNBs are also connected to an NGC via an NG interface.

More specifically, the gNBs are connected to an access and mobility management function (AMF) via an N2 interface and a User Plane Function (UPF) via an N3 interface.

NR (New Rat) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an orthogonal frequency division multiplexing (OFDM) numerology and a frame structure, which may be considered in the NR system, will be described.

A plurality of OFDM numerologies supported in the NR system may be defined as in Table 1.

TABLE 1

| μ | $\Delta f = 2^\mu \cdot 15$ [kHz] | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |
| 5 | 480 | Normal |

Regarding a frame structure in the NR system, a size of various fields in the time domain is expressed as a multiple of a time unit of $T_s=1/(\Delta f_{max} \cdot N_f)$. In this case, $\Delta f_{max}=480 \cdot 10^3$, and $N_f=4096$. DL and UL transmission is configured as a radio frame having a section of $T_f=(\Delta f_{max} N_f/100) \cdot T_s=10$ ms. The radio frame is composed of ten subframes each having a section of $T_{sf}=(\Delta f_{max} N_f/1000) \cdot T_s=1$ ms. In this case, there may be a set of UL frames and a set of DL frames.

Figure 5:
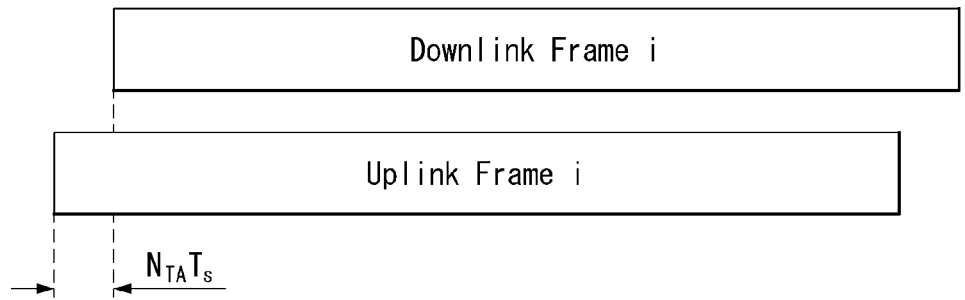
FIG. 5 shows a relation between an uplink frame and a downlink frame in a wireless communication system to which a method proposed in this specification may be applied.

FIG. 5 illustrates a relation between an uplink frame and a downlink frame in a wireless communication system to which a method proposed by the present specification is applicable.

As illustrated in FIG. 5, a UL frame number I from a User Equipment (UE) needs to be transmitted $T_{TA}=N_{TA}T_s$ before the start of a corresponding DL frame in the UE.

Regarding the numerology μ, slots are numbered in ascending order of $n_s^\mu \in \{0, \ldots, N_{subframe}^{slots,\mu}-1\}$ in a subframe, and in ascending order of $n_{s,f}^\mu \in \{0, \ldots, N_{frame}^{slots,\mu}-1\}$ in a radio frame. One slot is composed of continuous OFDM symbols of $N_{symb}^\mu$, and $N_{symb}^\mu$ is determined depending on a numerology in use and slot configuration. The start of slots $n_s^\mu$ in a subframe is temporally aligned with the start of OFDM symbols $n_s^\mu N_{symb}^\mu$ in the same subframe.

Not all UEs are able to transmit and receive at the same time, and this means that not all OFDM symbols in a DL slot or an UL slot are available to be used.

Table 2 shows the number of OFDM symbols per slot for a normal CP in the numerology μ, and Table 3 shows the number of OFDM symbols per slot for an extended CP in the numerology μ.

TABLE 2

Slot configuration

| | | 0 | | | 1 | |
|---|---|---|---|---|---|---|
| μ | $N_{symb}^{\mu}$ | $N_{frame}^{slots\mu}$ | $N_{subframe}^{slots\mu}$ | $N_{symb}^{\mu}$ | $N_{frame}^{slots\mu}$ | $N_{subframe}^{slots\mu}$ |
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | — | — | — |
| 4 | 14 | 160 | 16 | — | — | — |
| 5 | 14 | 320 | 32 | — | — | — |

TABLE 3

Slot configuration

| | | 0 | | | 1 | |
|---|---|---|---|---|---|---|
| μ | $N_{symb}^{\mu}$ | $N_{frame}^{slots\mu}$ | $N_{subframe}^{slots\mu}$ | $N_{symb}^{\mu}$ | $N_{frame}^{slots\mu}$ | $N_{subframe}^{slots\mu}$ |
| 0 | 12 | 10 | 1 | 6 | 20 | 2 |
| 1 | 12 | 20 | 2 | 6 | 40 | 4 |
| 2 | 12 | 40 | 4 | 6 | 80 | 8 |
| 3 | 12 | 80 | 8 | — | — | — |
| 4 | 12 | 160 | 16 | — | — | — |
| 5 | 12 | 320 | 32 | — | — | — |

NR Physical Resource

Regarding physical resources in the NR system, an antenna port, a resource grid, a resource element, a resource block, a carrier part, etc. may be considered.

Hereinafter, the above physical resources possible to be considered in the NR system will be described in more detail.

First, regarding an antenna port, the antenna port is defined such that a channel over which a symbol on one antenna port is transmitted can be inferred from another channel over which a symbol on the same antenna port is transmitted. When large-scale properties of a channel received over which a symbol on one antenna port can be inferred from another channel over which a symbol on another antenna port is transmitted, the two antenna ports may be in a QC/QCL (quasi co-located or quasi co-location) relationship. Herein, the large-scale properties may include at least one of Delay spread, Doppler spread, Frequency shift, Average received power, and Received Timing.

Figure 6:
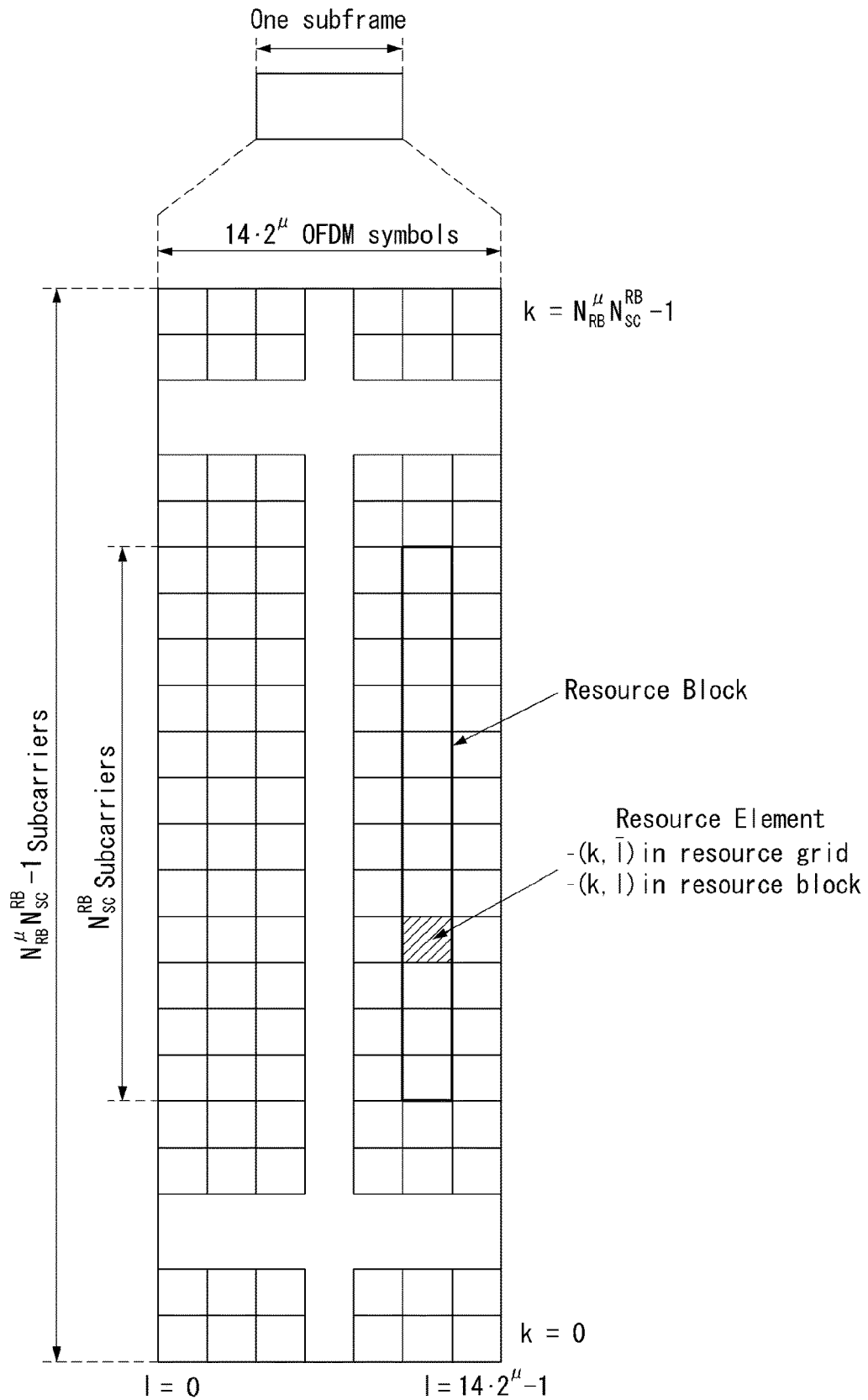
FIG. 6 shows an example of a resource grid supplied in a wireless communication system to which a method proposed in this specification may be applied.

FIG. 6 illustrates an example of a resource grid supported in a wireless communication system to which a method proposed by the present specification is applicable.

Referring to FIG. 6, a resource grid is composed of $N_{RB}^{\mu}N_{sc}^{RB}$ subcarriers in a frequency domain, each subframe composed of 14·2μ OFDM symbols, but the present disclosure is not limited thereto.

In the NR system, a transmitted signal is described by one or more resource grids, composed of $N_{RB}^{\mu}N_{sc}^{RB}$ subcarriers, and $2^{\mu}N_{symb}^{(\mu)}$ OFDM symbols Herein, $N_{RB}^{\mu} \leq N_{RB}^{max,\mu}$. The above $N_{RB}^{max,\mu}$ indicates the maximum transmission bandwidth, and it may change not just between numerologies, but between UL and DL.

Figure 7:
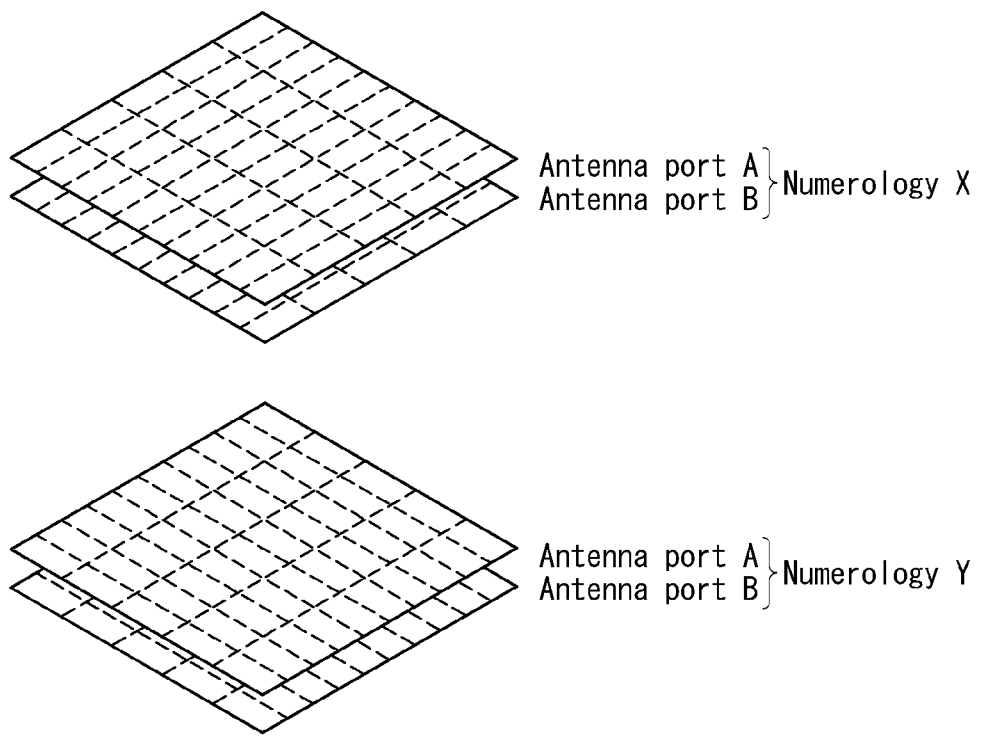
FIG. 7 shows examples of a resource grid for each antenna port and numerology to which a method proposed in this specification may be applied.

In this case, as illustrated in FIG. 7, one resource grid may be configured per the numerology μ and an antenna port p.

FIG. 7 illustrates examples of a resource grid per antenna port and numerology to which a method proposed by the present specification is applicable.

Each element of the resource grid for the numerology μ and the antenna port p is indicated as a resource element, and may be uniquely identified by an index pair (k,l). Herein, $k=0, \ldots, N_{RB}^{\mu}N_{sc}^{RB}-1$ is an index in the frequency domain, and $l=0, \ldots, 2^{\mu}N_{symb}^{(\mu)}-1$ indicates a location of a symbol in a subframe. To indicate a resource element in a slot, the index pair (k,l) is used, where $l=0, \ldots, N_{symb}^{\mu}-1$.

The resource element (k,l) for the numerology μ and the antenna port p corresponds to a complex value $a_{k,l}^{(p,\mu)}$. When there is no risk of confusion or when a specific antenna port or numerology is specified, the indexes p and μ may be dropped and thereby the complex value may become $a_{k,l}^{(p)}$ or $a_{k,l}$.

In addition, a physical resource block is defined as $N_{sc}^{RB}=12$ continuous subcarriers in the frequency domain. In the frequency domain, physical resource blocks may be numbered from 0 to $N_{RB}^{\mu}-1$. At this point, a relationship between the physical resource block number $n_{PRB}$ and the resource elements (k,l) may be given as in Equation 1.

$$n_{PRB} = \left\lfloor \frac{k}{N_{sc}^{RB}} \right\rfloor \quad \text{[Equation 1]}$$

In addition, regarding a carrier part, a UE may be configured to receive or transmit the carrier part using only a subset of a resource grid. At this point, a set of resource blocks which the UE is configured to receive or transmit are numbered from 0 to $N_{URB}^{\mu}-1$ in the frequency region.

Self-Contained Slot Structure

Figure 8:
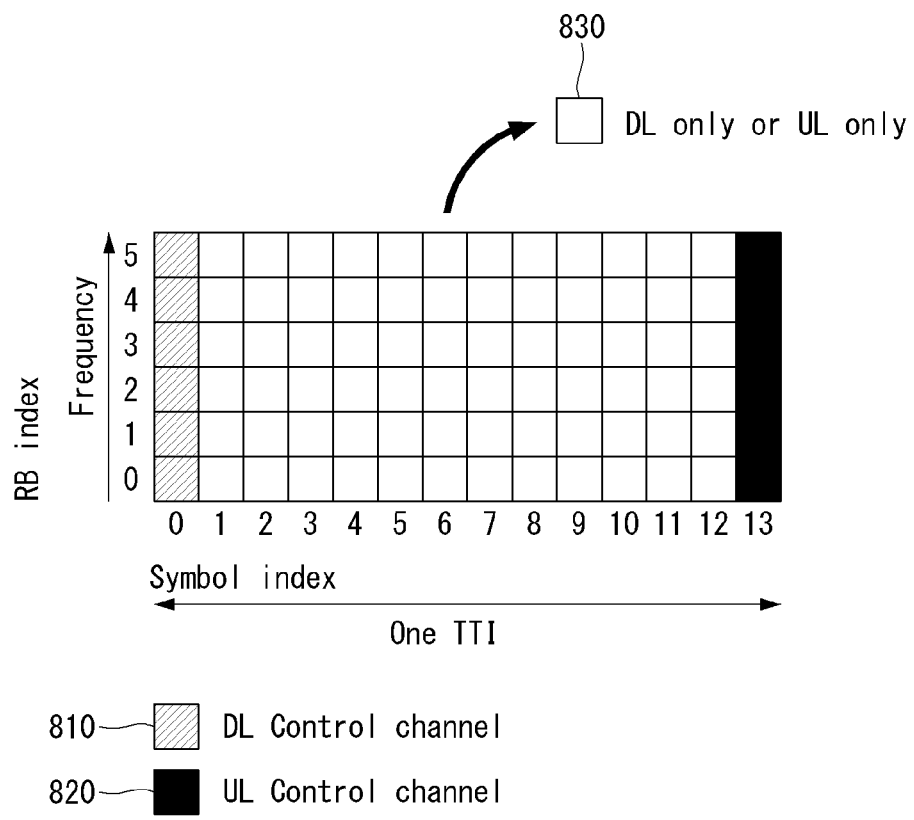
FIG. 8 shows examples of a resource grid for each antenna port and numerology to which a method proposed in this specification may be applied.

To minimize latency of data transmission in a TDD system, 5G new RAT (NR) has considered a self-contained slot structure illustrated in FIG. 8.

That is, FIG. 8 illustrates an example of a self-contained slot structure to which a method proposed by the present specification is applicable.

In FIG. 8, a hatched portion 810 denotes a downlink control region, and a black portion 820 denotes an uplink control region.

A non-marked portion 830 may be used for downlink data transmission or uplink data transmission.

Such a structure may be characterized in that DL transmission and UL transmission are sequentially performed in one slot, DL data is sent in one slot, and UL Ack/Nack is also transmitted and received in one slot.

Such a slot may be defined as a 'self-contained slot'.

That is, through the slot structure, the base station reduces the time it takes to retransmit data to the UE when a data transmission error occurs, and thus can minimize latency of final data delivery.

In the self-contained slot structure, the base station and the UE require a time gap in a process for switching from a transmission mode to a reception mode or a process for switching from the reception mode to the transmission mode.

To this end, in the corresponding slot structure, some OFDM symbols at time of switching from DL to UL are configured as a guard period (GP).

Analog/Hybrid Beamforming

Figure 9:
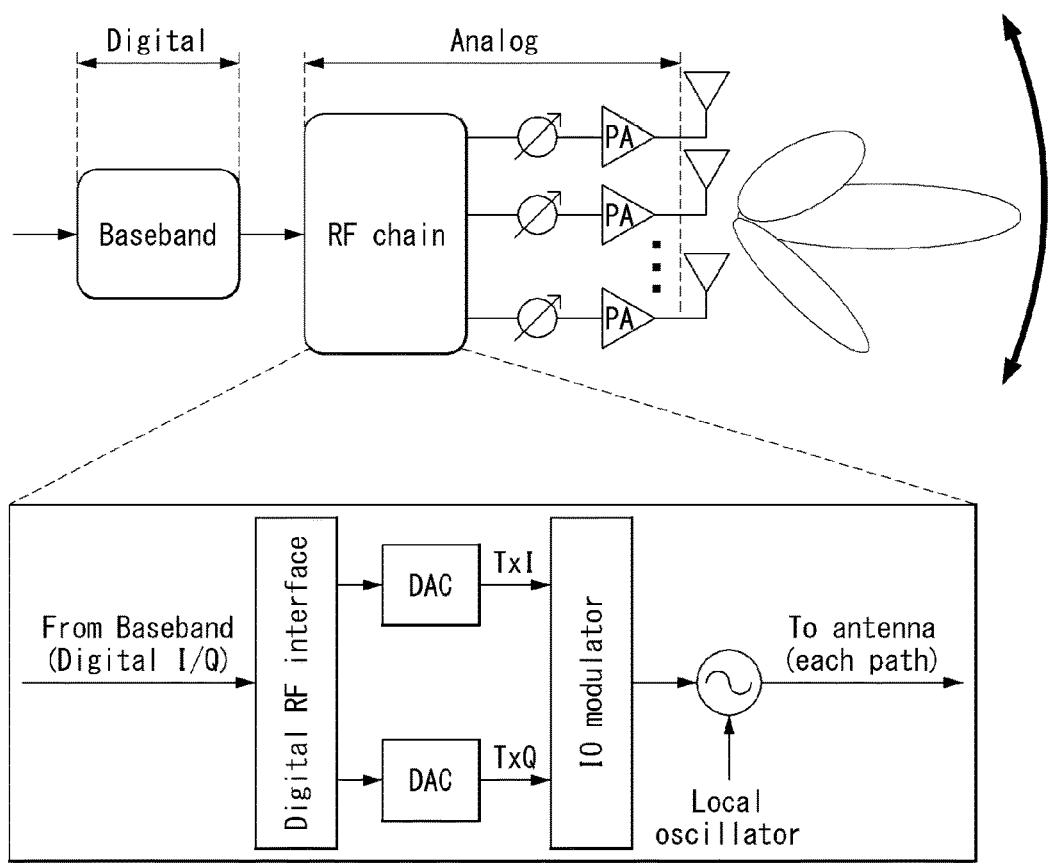
FIG. 9 is a block diagram of a transmitter including an analog beamformer and an RF chain.
Figure 10:
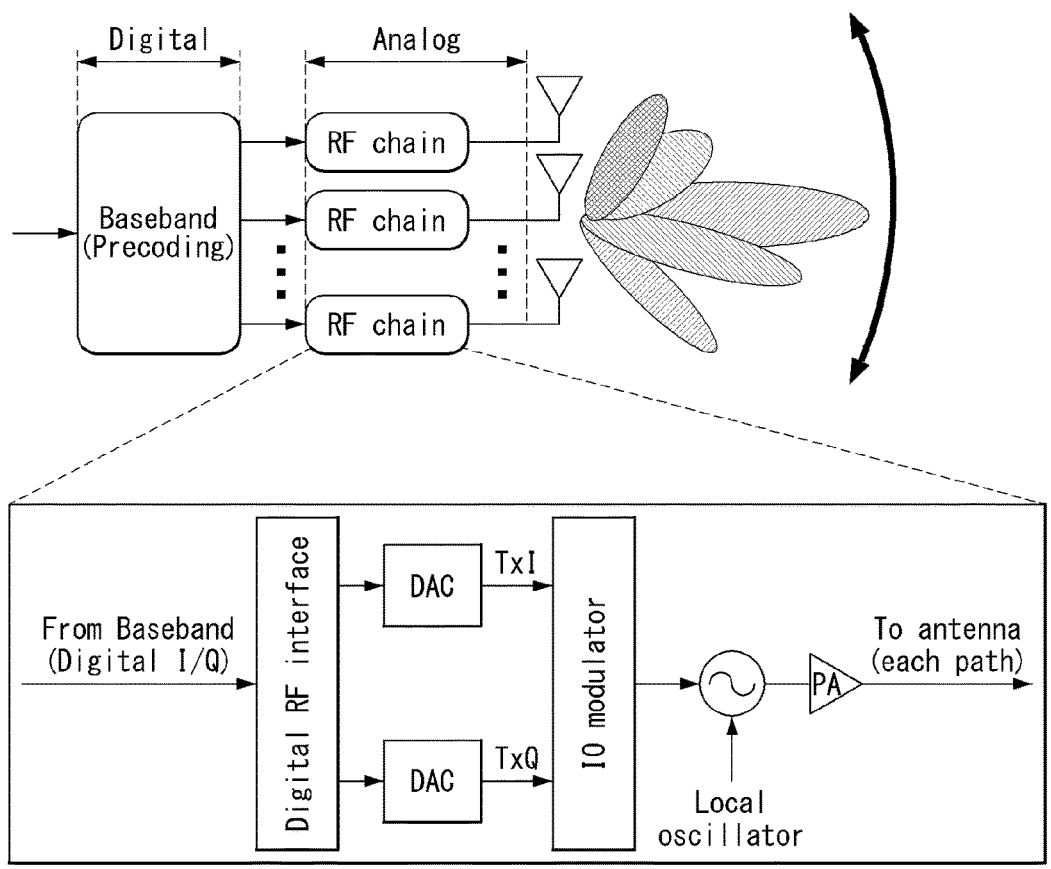
FIG. 10 is a block diagram of a transmitter including a digital beamformer and an RF chain.

FIG. 9 is a block diagram of a transmitter including an analog beamformer and an RF chain, and FIG. 10 is a block diagram of a transmitter including a digital beamformer and an RF chain.

Existing beamforming techniques using multiple antennas may be classified into analog beamforming techniques and digital beamforming techniques according to a position where a beamforming weight vector/precoding vector is applied.

First, the analog beamforming method is a typical beamforming technique applied to an initial multi-antenna structure. An analog signal completed in digital signal processing is branched into a plurality of paths and beamforming is performed through phase-shift (PS) of each path and power amplifier configuration. In order to form an analog beam, a structure in which the PA and the PS connected to each antenna processes an analog signal derived from a single digital signal as shown in FIG. 9 is required. In other words, a complex weight is processed by the PS and the PA in an analog stage. In this case, an RF chain refers to a processing block in which a BB signal is converted into an analog signal, and a configuration thereof is shown in FIG. 10. However, in the analog beamforming technique, accuracy of a beam is determined according characteristics of devices of the PS and PA and is advantageous for narrowband transmission in terms of control characteristics of the devices. In addition, due to a hardware structure difficult to implement multi-stream transmission, a multiplexing gain for increasing a transfer rate is relatively small and it is difficult to form beams for each user based on orthogonal resource allocation.

Next, unlike the analog beamforming technique, a digital beamforming technique performs beamforming at a digital stage by using a BB process to maximize diversity and multiplexing gain in a MIMO environment. That is, it is possible to form a beam by performing precoding in the BB process as shown in FIG. 10 (Here, the RF chain includes the PA). This is because a complex weight derived for beam formation is directly applied to transmission data. In addition, since different beams may be formed for each user, multi-user beam formation may be simultaneously supported, and since it is possible to independently form a beam for each user to which an orthogonal resource is allocated, scheduling flexibility is so high that a transmission end corresponding to a system purpose is possible. In addition, when a technique such as MIMO-OFDM is applied in a broadband transmission environment, an independent beam may be formed for each subcarrier. Therefore, the digital beamforming technique may maximize a maximum data rate of a single user based on an increase in system capacity and an enhanced beam gain. Therefore, a digital beamforming-based MIMO technology has been introduced in 3G/4G systems.

Next, a massive MIMO environment in which the transmit/receive antennas increase significantly is assumed.

In cellular communication, up to eight transmit/receive antennas are assumed to be applied to a MIMO environment. But with the evolution of massive MIMO, the number of antennas increases to dozens or even hundreds or more. If the digital beamforming technology is applied in the massive MIMO environment, signal processing on hundreds of antennas for digital signal processing at a transmission end is performed through a BB process, signal processing complexity is significantly increased, and since RF chains corresponding to the number of antennas is required, hardware implementation complexity is significantly increased. Further, independent channel estimation is required for every antenna, and in the case of an FDD system, feedback information for a massive MIMO channel including all antennas is required, and thus, pilot and feedback overhead are significantly increased. When the analog beamforming technique is applied in the massive-MIMO environment, the hardware complexity of the transmission end is relatively low, but the degree of performance increase using the multiple antennas is insignificant and flexibility of resource allocation is lowered. In particular, it is very difficult to control a beam for each frequency during broadband transmission. Therefore, in the massive MIMO environment, a hybrid transmission end configuration method combining the analog beamforming and the digital beamforming structure, instead of exclusively selecting one of the analog beamforming and the digital beamforming techniques is required. In other words, a hybrid type transmission end structure capable of lowering hardware implementation complexity of the transmission end and obtaining a beamforming gain using massive antennas is required to be designed using a relationship between performance gain and complexity of the analog beamforming technique and the digital beam forming technique.

In general, a transmission/reception structure using analog beamforming may select a pure analog beamforming transmitter/receiver and a hybrid beamforming transmitter/receiver. In general, in the analog beam scanning, one beam may be tracked at the same time. Therefore, a training time required for beam scanning is proportional to a total number of candidate beams.

Pure analog beamforming requires a beam scanning process in a time domain for transmission/reception end beam tracking. In other words, the analog beam tracking requires a time $K_T \times K_R$ equal to the number of beams for transmission and reception. When a time for one beam scanning is $t_s$, a tracking time $T_s$ for the entire transmission/reception beams may be represented by Equation 2 below.

$$T_S = t_s \times (K_T \times K_R) \qquad \text{[Equation 2]}$$

For example, assuming that a total number of transmitted beams is K_T=L and the number of received beams is K_R=1, the total number of candidate beams totals L and thus L time intervals are required in the time domain.

Figure 11:
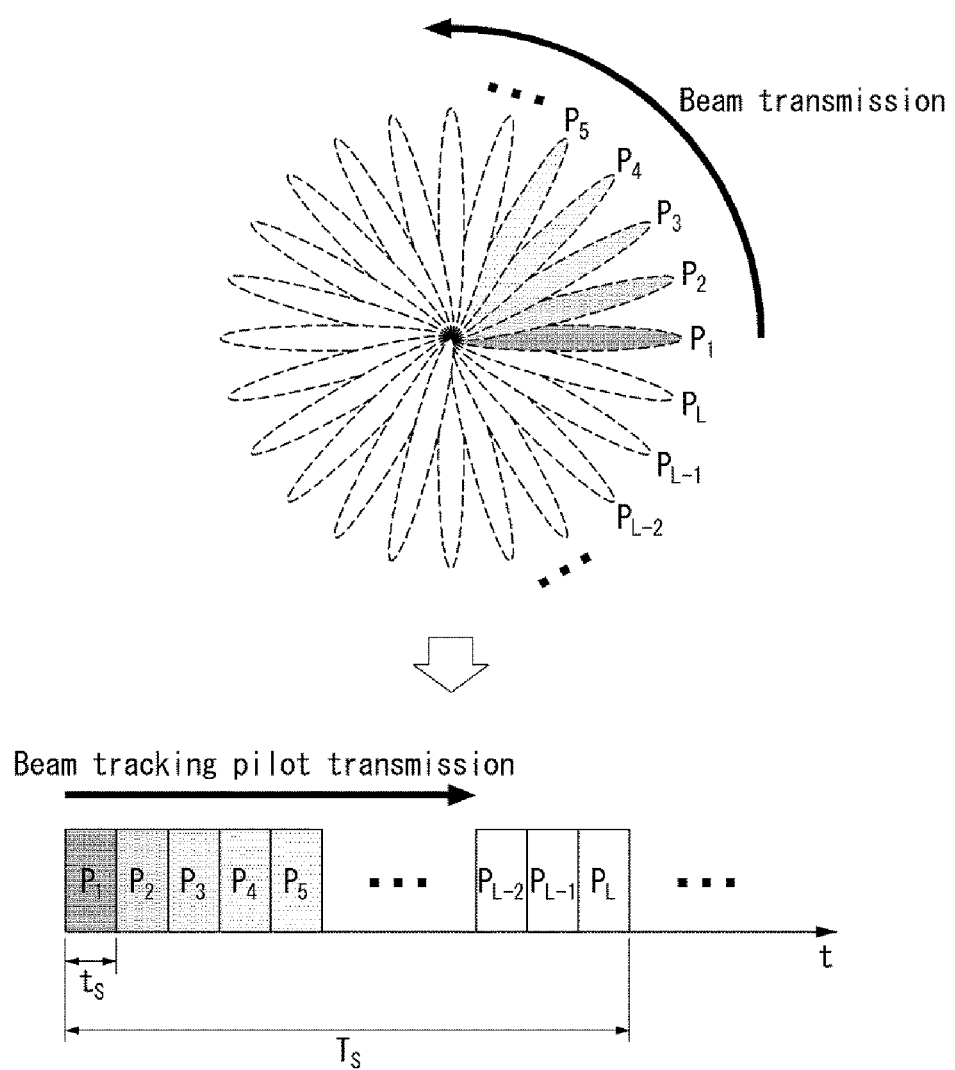
FIG. 11 illustrates a time domain beam tracking interval required for analog beam tracking.

FIG. 11 is a diagram illustrating a time domain beam tracking interval required for analog beam tracking. As shown in FIG. 11, only one beam tracking is possible in a single time interval for analog beam tracking, and it can be known that L time intervals are required for total L beam tracking. A UE feeds back a beam ID having the highest signal strength to the BS when the analog beam tracking process is terminated.

In other words, it can be seen that a longer training time is required as the number of individual beams increases due to an increase in the number of transmit/receive antennas.

Accordingly, since analog beamforming changes a magnitude and phase angle of continuous waveforms in the time domain after DAC, a training interval for individual beams must be guaranteed unlike digital beamforming. As the interval is longer, loss of the system increases, and the system loss may increase when additional beam scanning is performed on movement of a UE and a change in channel.

An actual beam scanning method will be described with reference to FIGS. 12 and 13.

Figure 12:
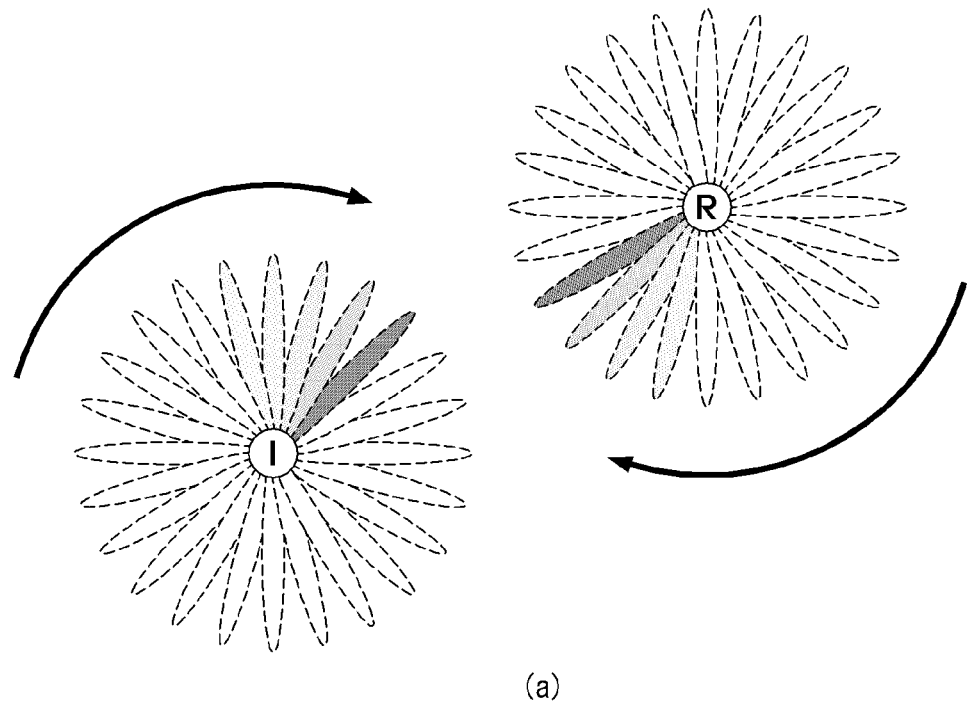
FIG. 12 is a diagram illustrating beam scanning.
Figure 12:
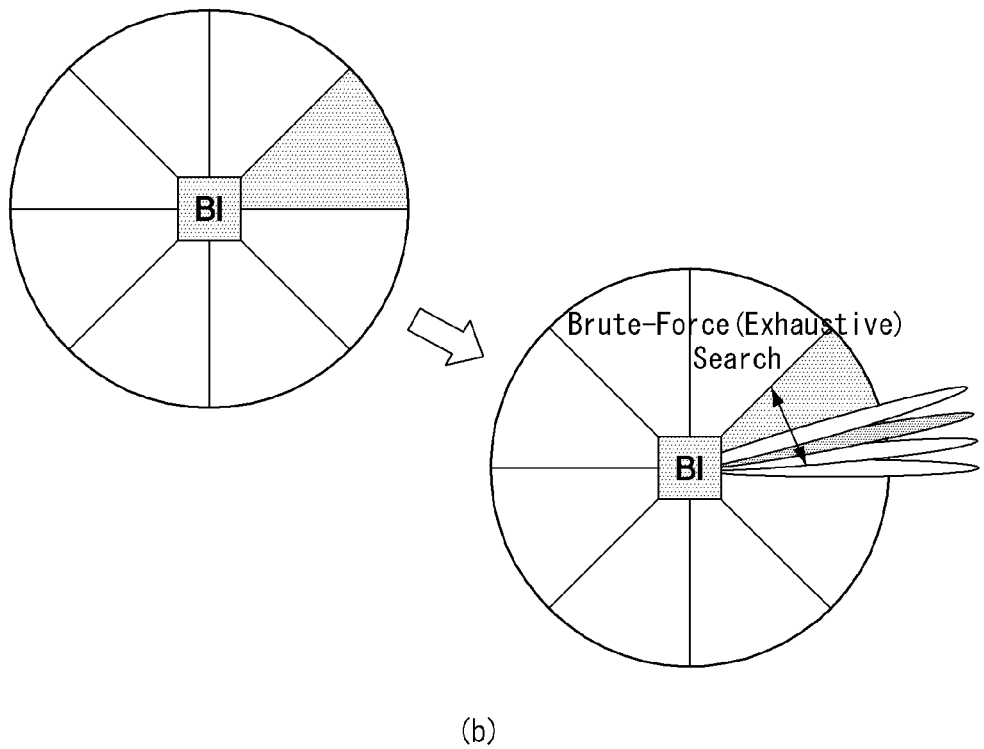
Figure 13:
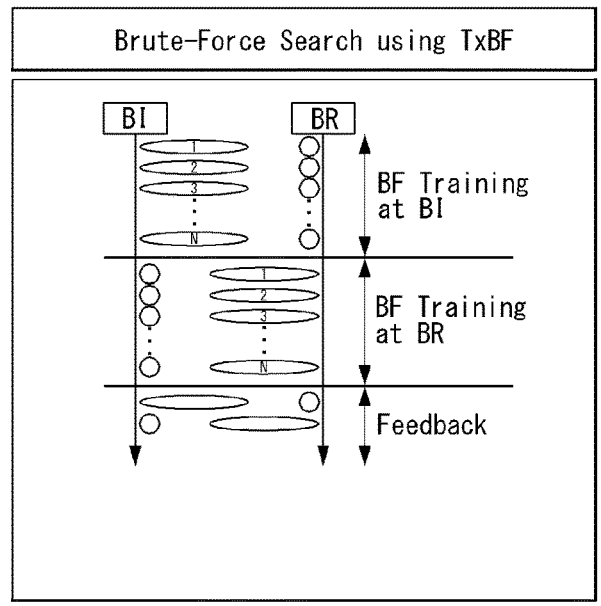
FIG. 13 is a diagram for a beam searching procedure.
Figure 13:
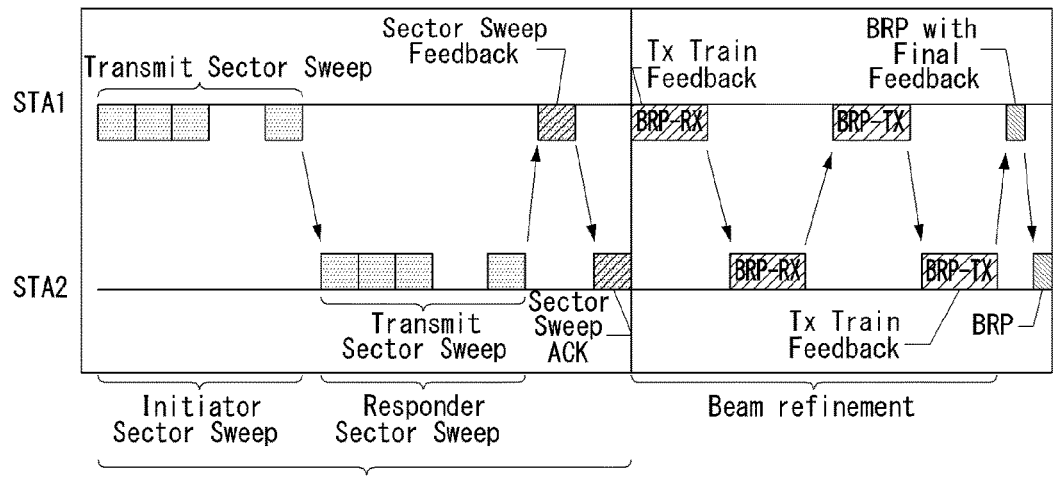

FIG. 12 is a diagram illustrating beam scanning, in which FIG. 12(*a*) is a diagram for exhaustive search and FIG. 12(*b*) is a diagram for multi-level search.

The number of search spaces of complete search shown in FIG. 12(*a*) is shown in Table 4 below.

TABLE 4

| | Beam-width: 1° | Beam-width: 5° | Beam-width: 10° |
|---|---|---|---|
| 2D | 360 | 72 | 36 |
| 3D | 129,600 | 5,184 | 1,296 |

The number of search spaces of the multi-level search shown in FIG. 12(*b*) is shown in Table 5 below.

TABLE 5

| | Beam-width: 1° | | Beam-width: 10° | |
|---|---|---|---|---|
| | Coarse beam | Fine beam | Coarse beam | Fine beam |
| 2D | 8 | 45 | 8 | 4.5 |
| 3D | 64 | 2,025 | 64 | 20.25 |

*Total No. of sectors: 8 (fixed)
*No. of fine beams: described per each coarse beam
*Depending on: No. of coarse beams + No of Fine beam FIG. 13 is a diagram of a beam search procedure, in which FIG. 13(a) shows a procedure for full search and FIG. 13(b) shows a procedure for multi-level search.

In the case of full search, an optimal transmission beam ID (Best Tx beam ID) is fed back, and in the case of multi-level search, i) in the case of a coarse beam, the best sector beam ID is fed back and ii) In the case of a fine beam, the best fine beam ID is fed back.

Reference Signal (RS) in NR

A downlink (DL) physical layer signal of an NR system is as follows.

CSI-RS: Signal for DL CSI (channel state information) acquisition and DL beam measurement TRS (tracking RS): Signal for fine time/frequency tracking of UE DL DMRS: RS for PDSCH demodulation DL PT-RS (phase-tracking RS): RS transmitted for compensation of phase noise SSB (synchronization signal block): A resource block composed of a specific number of symbols & resource blocks in time/frequency side consisting of a primary synchronization signal (PSS), a secondary synchronization signal (SSS), and a PBCH (+PBCH DMRS) (Signals in one SSB apply the same beam)

Uplink (UL) physical layer signals of the NR system are as follows.

SRS: Signal for UL CSI (channel state information) acquisition, UL beam measurement, and antenna port selection UL DMRS: RS for PUSCH demodulation UL PT-RS (phase-tracking RS): RS transmitted for compensation of phase noise of BS Beam Management and Beam Recovery The BS may request periodic CSI/beam report, semi-persistent CSI/beam report (periodic report is activated only for a specific time interval or reporting is performed a plurality of consecutive times), or aperiodic CSI/beam report from the UE. Here, the CSI report information may include a specific combination of a rank indicator (RI), a precursor matrix indication (PMI), channel quality information (CQI), a CSI-RS resource indicator (CRI), and a layer indicator (LI). The beam report information may include a specific combination of a CRI indicating a preferred beam index when an RS for beam quality measurement is a CSI-RS, a SSBID indicating a preferred beam index when beam quality measurement RS is an SSB, and RS received power (RSRP) information indicating beam quality.

For periodic and semi-persistent (SP) CSI/beam reporting, a UL (uplink) physical channel (e.g., PUCCH, PUSCH) for CSI/beam reporting at a specific period is allocated to the UE during reporting activated period. In order to measure the CSI of the UE, transmission of a downlink (DL) reference signal (RS) of the BS is required. In a beamformed system to which analog beamforming is applied, it is necessary to determine a DL transmission (Tx)/reception (Rx) beam pair for transmitting/receiving the DL RS and a UL Tx/Rx beam pair for transmitting/receiving uplink control information (UCI), e.g., CSI, ACK/NACK). The DL beam pair determination procedure may include a combination of a TRP Tx beam selection procedure in which a BS transmits DL RSs corresponding to a plurality of TRP Tx beams so that the UE selects and/or reports one of them and a procedure in which the same RS signal corresponding to each TRP Tx beam is repeatedly transmitted and the repeatedly transmitted signals are measured with different UE Rx beam to select a UE Rx beam. The UL beam pair determination procedure may include a combination of a procedure in which the UE transmits UL RSs corresponding to a plurality of UE Tx beams and the BS selects and/or signals one of them and a procedure in which the same RS signal corresponding to each UE Tx beam is repeatedly transmitted and the repeatedly transmitted signals are measured with different TRP Rx beam to select a TRP Rx beam. If beam reciprocity (or beam correspondence) of the DL/UL is established, that is, if it is assumed that the BS DL Tx beam and the BS UL Rx beam are matched and UE UL Tx beam and the UE DL Rx beam are matched in communication between the BS and the UE, a procedure for determining the other may be omitted if only one of the DL beam pair and the UL beam pair is determined.

The determination process for the DL and/or UL beam pair may be performed periodically or aperiodically. In a case where the number of candidate beams is large, it is not preferable that this process occurs frequently because the required RS overhead may be large. It is assumed that periodic or SP CSI reporting is performed after the DUUL beam pair determination process is completed. Here, the CSI-RS including a single or a plurality of antenna ports for measuring the CSI of the UE may be beamformed by a TRP Tx beam determined as a DL beam and transmitted, and a transmission period of the CSI-RS may be equal to the CSI reporting period or the CSI-RS may be more frequently transmitted. Alternatively, it is also possible to transmit the aperiodic CSI-RS at a CSI reporting period or more frequently. The UE periodically transmits the measured CSI information by the UL Tx beam determined in the UL beam pair determination process.

In performing the DL/UL beam management process, a beam mismatch problem may occur according to a set period of beam management. In particular, in case where a wireless channel environment is changed as the UE changes in position or rotates or due to movement of a nearby object (e.g., a line of sight (LoS) environment is changed to non-LoS environment as the beam is blocked), the optimal DL/UL beam pair may be changed. Such a change is a beam management process generally performed by a network indication and it can be said that a beam failure event occurs when tracking fails. The occurrence of such a beam failure event may be determined by the UE through reception quality of the downlink RS, and a report message or a message for requesting beam recovery (hereinafter, referred to as a beam failure recovery request (BFRQ) message) must be delivered from the UE. The BS receiving the message may perform beam recovery through various processes such as beam RS transmission and beam reporting request for beam recovery. This series of beam recovery processes is called beam failure recovery (BFR).

The BFR process is configured as follows.

1) Beam Failure Detection (BFD)

When all PDCCH beams fall below a predetermined quality value Q_out, it is determined that one beam failure instance has occurred, and this is used as a criterion (Here, the quality value is based on a hypothetical BLER (block error rate).

The BLER refers to a probability that demodulation of information fails if it is assumed that control information is transmitted to a corresponding PDCCH.

Here, as for all PDCCH beams, one or a plurality of search spaces for monitoring the PDCCH may be set in the UE. The beams may be set to be different for each search space, in which case it means a case where all the beams falls below the BLER threshold.

a) Implicit Configuration of BFD RSs

More specifically, each search space is set a control resource set (CORESET) ID, which is a resource region in which the PDCCH may be transmitted, and RS information (e.g., CSI-RS resource ID, SSB ID) QCL-ed in terms of spatial RX parameters may be indicated/configured for each CORESET ID.

Here, the QCL RS may be indicated/configured through transmit configuration information (TCI). Here, the RS QCL-ed in terms of the spatial RX parameter (i.e., QCL Type D) means that the BS informs the UE that the UE may use as is the beam which was used for receiving the spatially QCL-ed RS to receive the corresponding PDCCH DMRS. As a result, it is a method, from the viewpoint of the BS, of notifying the UE that the transmission will be performed by applying the same transmission beam or a similar transmission beam (e.g., when the beam widths are different while a beam direction is the same/similar) between spatially QCL-ed antenna ports.

b) Explicit Configuration of BFD RSs

Alternatively, the BS may explicitly configure beam RS(s) for the purpose (for beam failure detection), in which case the corresponding beam RS(s) corresponds to the "all PDCCH beams".

In this case, when the beam failure instance occurs a predetermined number of times, the UE may declare that beam failure has occurred.

Meanwhile, the UE may also declare that beam failure has occurred if the beam failure instance occurs a predetermined number of times in succession.

2) New Beam Identification and Selection

The new beam identification and selection process may include three steps below.

(Step 1)

The UE searches for a beam having a predetermined quality value ($Q\_in$) or higher among RSs set by the BS as a candidate beam RS set.

If one beam RS exceeds the quality value, the corresponding beam RS may be selected; if a plurality of beam RSs exceeds the quality value, one of the corresponding beam RSs may be selected, and if there is no beam exceeding the quality value, step 2 may be performed.

Here, the beam quality may be determined based on an RSRP.

In addition, the RS beam set configured by the BS may include three cases below.

I) When the beam RSs in the RS beam set all include SSBs, ii) When the beam RSs in the RS beam set all include CSI-RS resources, iii) When the beam RSs in the RS beam set include SSBs and CSI-RS resources.

(Step 2)

The UE may search for a beam having a predetermined quality value $Q\_in$ or higher among the SSBs. In this case, the SSBs may be SSBs connected to a contention-based PRACH.

If one SSB exceeds the quality value, the corresponding beam RS may be selected; if a plurality of SSBs exceeds the quality value, one of the beam RSs may be selected, and if there is no beam exceeding the quality value, step 3 may be performed.

(Step 3)

The UE may select any SSB among SSBs regardless of quality value.

In this case, the SSBs may be SSBs connected to a contention-based PRACH.

3) BFRQ and Monitoring gNB's Response

The UE may transmit a PRACH resource and a preamble configured to be directly or indirectly connected to the beam RS (CSI-RS or SSB) selected in the above process 2) to the BS.

Here, the direct connection configuration may be used in the following two cases.

i) In case where contention-free PRACH resource and preamble are configured for a specific RS in a candidate beam RS set separately configured for BFR.

ii) In case where PRACH resource and preamble mapped respectively to SSBs configured for other purposes, such as random access, are configured (Here, PRACH may be contention-based PRACH)

Here, the indirect connection configuration may be used in the following cases.

i) In case where contention-free PRACH resource and preamble are not configured for specific CSI-RS in candidate beam RS set separately configured for BFR In this case, the UE selects a contention-free PRACH resource and preamble connected to the SSB designated as being capable of being received by the same reception beam as the corresponding CSI-RS (i.e., quasi-co-located (QCL-ed) with respect to spatial Rx parameter).

The UE monitors a response of the BS (gNB) for the corresponding PRACH transmission.

Here, the response to the contention-free PRACH resource and preamble is transmitted in a PDCCH masked with a C-RNTI, and the PDCCH is received in a search space separately RRC configured for BFR.

Here, the search space may be set to a specific CORESET (for BFR).

The response to the contention-based PRACH may reuse the search space and the CORESET (e.g., CORESET 0 or CORESET 1) configured for a general contention PRACH-based random access process.

If there is no reply for a certain time, the new beam identification and selection process and the BFRQ and BS response monitoring process are repeated.

The process is performed until the PRACH transmission reaches a predetermined maximum number N_max or until a set timer expires. When the timer expires, the UE stops the contention-free-based PRACH transmission, but the transmission of the contention-based PRACH based on the SSB selection is performed until N_max is reached.

A beam failure detection and recovery procedure disclosed in 3GPP TS38.321 is as follows.

Beam Failure Detection and Recovery Procedure

When a beam failure is detected in the serving SSB(s)/CSI-RS(s), A beam failure recovery procedure used to instruct to the serving gNB of the new SSB or CSI-RS may be configured by RRC for the MAC entity.

Beam failure may be detected by beam failure instance counting from a lower layer to a MAC entity.

Parameters in 'BeamFailureRecoveryConfig' configured by the RRC for beam failure detection and recovery procedures are shown in Table 6 below.

TABLE 6

- beamFailureInstanceMaxCount for the beam failure detection;
- beamFailureDetectionTimer for the beam failure detection;
- beamFailureRecoveryTimer for the beam failure recovery procedure;
- rsrp-ThresholdSSB: an RSRP threshold for the beam failure recovery;
- powerRampingStep: powerRampingStep for the beam failure recovery;
- preambleReceivedTargetPower: preambleReceivedTargetPower for the beam failure recovery;
- preambleTransMax: preambleTransMax for the beam failure recovery;
- ra-ResponseWindow: the time window to monitor response(s) for the beam failure recovery using contention-free Random Access Preamble;
- prach-ConfigIndex: prach-ConfigIndex for the beam failure recovery;
- ra-ssb-OccasionMaskIndex: ra-ssb-OccasionMaskIndex for the beam failure recovery;
- ra-OccasionList: ra-OccasionList for the beam failure recovery.

UE variables may be used for the beam failure detection procedure.
BFI_COUNTER: Counter for beam failure instance indication which is initially set to 0
A MAC entity may operate as follows.
1) When a beam failure instance indication is received from a lower layer,
2) BeamFailureDetectionTimer is started or restarted and the BFI_COUNTER is increased by one each time.
Here, if BFI_COUNTER is greater than or equal to beamFailureInstanceMaxCount,
3) When beamFailureRecoveryConfig is configured
A beamFailureRecoveryTimer is started and a random access procedure is started on the SpCell by applying the powerRampingStep, preambleReceivedTargetPower, and preambleTransMax parameters of the beamFailureRecoveryConfig received from the RRC.
3-1) If beamFailureRecoveryConfig is not configured, the random access procedure is started on the SpCell.
If the beamFailureDetectionTimer expires, BFI_COUNTER is set to 0.
If the random access procedure is successfully completed, the beamFailureRecoveryTimer is stopped and the beam failure recovery procedure is considered to have been completed successfully.

As described above, after the BFD, the UE transmits a physical random access channel (PRACH) for the BFRQ to the BS. Hereinafter, a way in which a beam of a physical uplink control channel (PUCCH) and/or a physical uplink shared channel (PUSCH) transmitted after the PRACH transmission is configured/defined will be described.

An NR system may designate a beam for each PUCCH resource using a spatial relation information field transmitted through higher layer signaling. Specifically, the BS may designate a SRS resource ID as an uplink signal or a CSI-RS resource ID or an SSB resource ID as a downlink signal, as spatial relation information.

That is, through higher layer signaling, the BS may instruct the UE to transmit the PUCCH using the same beam as a specific beam among previously transmitted SRS beams or transmits a transmission beam corresponding to a reception beam optimized for a specific downlink beam.

Here, a beam correspondence may be utilized between the transmission and reception beams.

In this case, the PUCCH beam indication method may be indicated by RRC or indicated in the form of designating one information among a plurality of pieces of spatial relation information by a MAC-CE message after the plurality of pieces of spatial relation information are configured in the RRC layer, and the indicated beam may be different for each PUCCH resource.

The PUCCH resource in NR defines a type of PUCCH, that is, a PUCCH format, for transmitting uplink control information (UCI) and a location of a time and/or frequency resource on which a corresponding PUCCH is transmitted. In NR, various PUCCHs are defined depending on a PUCCH usage (e.g., scheduling request (SR), HARQ ACK/NACK, CSI reporting), a range of a UCI payload size that may be transmitted in one PUCCH, and a symbol duration of the PUCCH.

Here, up to 128 PUCCH resources may be configured for one UE in NR, and may be grouped into a PUCCH resource set, which is an aggregation of PUCCH resources, so as to be configured. The PUCCH resource set is mainly used for grouping and setting PUCCH resource for transmitting HARQ ACK/NACK for DL-SCH (or PDSCH) according to the range of a ACK/NACK payload size so as to be transmitted in one PUCCH resource.

For example, PUCCH resources with ACK/NACK payload size of X bits or less are grouped in PUCCH resource set #A, and PUCCH resources with ACK/NACK payload size of X bits or more are grouped in PUCCH resource set #B.

Through which PUCCH resource HARQ-ACK/NACK for a specific PDSCH is to be transmitted may be dynamically indicated through PUCCH resource indicator (PRI) information included in downlink control information (DCI) transmitted in the PDCCH allocating the PDSCH.

Here, the PRI information may be included in both DCI format 1_0 (fallback DCI format) and DCI format 1_1 defined for a PDSCH scheduling purpose.

Hereinafter, specific contents of the PUCCH resource sets will be described.

The UE may configure up to four PUCCH resource sets by the higher layer parameter PUCCH-ResourceSet.

The PUCCH resource set is associated with a PUCCH resource set index provided by a higher layer parameter pucch-ResourceSetId, is associated with PUCCH resource indicex provided by higher layer parameter resourceList providing pucch-ResourceID set used for PUCCH resource set, and is associated with a maximum number of UCI information bits that the UE may transmit using the PUCCH resource in the PUCCH resource set provided by the higher layer parameter maxpayloadMinus1.

In the case of the first PUCCH resource set, the maximum number of UCI information bits is fixed to 2.

Here, the maximum UCI information bit is 1706 bits for the PUCCH resource set having the largest index other than the first index.

The maximum number of PUCCH resource indexes for the PUCCH resource set is provided by the higher layer parameter maxNrofPUCCH-ResourcesPerSet.

The maximum number of PUCCH resources of the first PUCCH resource set is 32 and the maximum number of PUCCH resources of the other PUCCH resource set is 8.

When the UE transmits the UCI information bits $N_{UCI}$ included in the HARQ-ACK information bits, the UE determines to configure the PUCCH resource set as follows.

i) When HARQ-ACK information and SR are simultaneously transmitted, if $N_{UCI}$ is equal to or less than 2 at one SR transmission time point and includes 1 or 2 bits of HARQ-ACK information and a positive or negative SR, a first set of PUCCH resources is pucch-ResourceSetID=0, or ii) When $N_2$ is a value given by higher layer parameter maxPayloadMinus1 for the PUCCH resource set, if it is given in a higher layer as $2<N_{UCI}\leq N_2$, a second set of PUCCH resources is pucch-ResourceSetID=1, or iii) When $N_3$ is a value given by the higher layer parameter maxPayloadMinus1 for the pucch-ResourceSetID=2 and PUCCH resource set, if $N_2<N_{UCI}\leq N_3$ is given in the higher layer, a third set of PUCCH resources is pucch-ResourceSetID=2, or Iv) if it is given in the higher layer as $N_3\leq N_{UCI}\leq 1706$ a fourth set of PUCCH resources is pucch-ResourceSetID=3.

For transmission of HARQ-ACK information in the PUCCH by the UE, the UE determines a set of PUCCH resources for HARQ-ACK information bits and then determines a PUCCH resource for HARQ_ACK information transmission.

The determination of the PUCCH resource is based on a PUCCH resource indicator field of the last DCI format 1_0 or DCI format 1_1 among DCI format 1_0 or DCI format 1_1 having a value of a PDSCH-to-HARQ feedback timing indicator field indicating the same slot.

The UE detects corresponding HARQ-ACK information on the PUCCH and transmits the same.

Here, the DCI formats detected for PUCCH resource determination are first indexed in descending order in a serving cell index and then indexed in ascending order in a PDCCH monitoring occasion index.

The PUCCH resource indicator field value is mapped from the PUCCH resource set provided by the higher layer parameter PUCCH-ResourceSet to the value of the PUCCH resource index set provided by the higher layer parameter ResourceList for the PUCCH resource as shown in Table 7. There are up to eight PUCCH resources.

TABLE 7

| PUCCH resource indicator | PUCCH resource |
|---|---|
| '000' | 1st PUCCH resource provided by pucch-ResourceId obtained from the 1st value of resourceList |
| '001' | 2nd PUCCH resource provided by pucch-ResourceId obtained from the 2nd value of resourceList |
| '010' | 3rd PUCCH resource provided by pucch-ResourceId obtained from the 3rd value of resourceList |
| '011' | 4th PUCCH resource provided by pucch-ResourceId obtained from the 4th value of resourceList |
| '100' | 5th PUCCH resource provided by pucch-ResourceId obtained from the 5th value of resourceList |
| '101' | 6th PUCCH resource provided by pucch-ResourceId obtained from the 6th value of resourceList |
| '110' | 7th PUCCH resource provided by pucch-ResourceId obtained from the 7th value of resourceList |
| '111' | 8th PUCCH resource provided by pucch-ResourceId obtained from the 8th value of resourceList |

If the size $R_{PUCCH}$ of the first set of PUCCH resources and the higher layer parameter resourceList is greater than 8, the UE determines the PUCCH resource index $r_{PUCCH}$ as shown in Equation 3 below when the UE provides HARQ-ACK information in the PUCCH transmission in response to detection of the last DCI format 1_0 or DCI format 1_1.

Here, $r_{PUCCH}$ is $0\leq r_{PUCCH}\leq R_{PUCCH}-1$.

In Equation 3, $N_{CCE,p}$ is the number of control channel elements (CCEs) of a control resource set P corresponding to a PDCCH response for DCI format 1_0 or DCI format 1_1.

$n_{CCE,p}$ is an index of a first CCE for the PDCCH response, and $\Delta_{PRI}$ denotes a value of a PUCCH resource indication field of DCI format 1_0 or DCI format 1_1.

As a result, the PUCCH resource set is determined according to the number of HARQ-ACK bits to be transmitted, and which of the PUCCH resources configured by resourceLists in the PUCCH resource set is to be used to transmit ACK/NACK is indicated by the DCI through the PRI.

Here, ACK/NACK for a plurality of PDSCHs each scheduled with a plurality of PDCCHs may be collected through one PUCCH resource and transmitted to the BS. Here, through which PUCCH the ACK/NACK is to be transmitted may be determined by PRI information which is transmitted by a lastly transmitted PRI information.

This is because k and j may be set to be flexible for a slot n where the DCI is transmitted, a slot n+k where the PDSCH allocated by the corresponding DCI is transmitted, and a slot n+k+j where ACK/NACK for the PDSCH is transmitted.

If the UE transmits the PRACH to the BS for BFRQ and the BS (gNB) successfully receives it, the BS may transmit a PDCCH response (i.e., msg. 2) to the UE, and here, msg.2 may be transmitted via a certain DCI format. That is, both DL DCI and UL DCI are available.

If the DL DCI is transmitted, the ACK/NACK PUCCH for the PDSCH allocated to the DCI should be transmitted to the BS, and the spatial relation information configured in the corresponding PUCCH resource is a beam indicated before the beam failure, and thus may be different from the UL beam corresponding to the new DL beam searched through the BFR process.

Accordingly, a problem may occur in that the probability that the corresponding ACK/NACK message is transmitted to the BS is reduced. In particular, in case where a separate DL DCI is transmitted (i.e., through a different search space) before or after a DCI transmitting a response to the BFRQ (through a search space set for BFR) as well as the corresponding ACK/NACK and the ACK/NACK for a plurality of PDSCHs is indicated to be transmitted through one PUCCH resource, a problem may occur in that an error probability of the ACK/NACK information for the corresponding PDSCH increases.

Accordingly, in this disclosure, a method for solving such a problem will be described.

(Method 1)

The UE transmits a PRACH for a beam failure recovery request after a beam failure is detected to the BS, and when a DCI received from the BS in the BFR search space is received, the UE transmits an HARQ-ACK/NACK for a PDSCH allocated by the DCI on a PUCCH.

Here, a transmission beam used for transmitting the PUCCH may be the same beam as the beam used for transmission of the PRACH.

$$r_{PUCCH} = \begin{cases} \left\lfloor \frac{n_{CCE,p} \cdot \lceil R_{PUCCH}/8 \rceil}{N_{CCE,p}} \right\rfloor + \Delta_{PRI} \cdot \left\lceil \frac{R_{PUCCH}}{8} \right\rceil & \text{if } \Delta_{PRI} < R_{PUCCH} \bmod 8 \\ \left\lfloor \frac{n_{CCE,p} \cdot \lfloor R_{PUCCH}/8 \rfloor}{N_{CCE,p}} \right\rfloor + \Delta_{PRI} \cdot \left\lfloor \frac{R_{PUCCH}}{8} \right\rfloor + R_{PUCCH} \bmod 8 & \text{if } \Delta_{PRI} \geq R_{PUCCH} \bmod 8 \end{cases}$$ [Equation 3]

This is because, if the BS normally receives the PRACH transmitted from the UE, since the DCI is transmitted, beam connection of the beam used for the PRACH transmission is recognized to be maintained. Here, the PRACH may be transmitted on a contention-free basis.

In addition, the value configured in the PUCCH resource may be ignored and changed to SSB resource ID or CSI-RS resource ID, which is a new beam RS corresponding to the PRACH.

In this case, the value set for the PUCCH resource may be a value set through RRC as spatial relation information, and the new beam RS may be maintained for a specific time, until ACK is received from the BS or until an indication for reconfiguration/change of the beam for the PUCCH resource is received from the BS.

In the method 1 described above, the UE may assume that the BS does not send another DL DCI at a time after the DCI is received from the BS or does not send ACK/NACK using the PUCCH resource together even if the BS transmits the DL DCI. In this case, the PUCCH resource may be a PUCCH resource indicated by a PRI included in the DCI format 1_0 or DCI format 1_1.

As described above, since up to 128 PUCCH resources may be configured, it may be desirable to maintain predetermined information by the spatial relation information without a change in the PUCCH resources other than the PUCCH resource.

However, in the beam failure state, beam information configured in the existing PUCCHs may be outdated with the current state.

Therefore, i) Method 1 may be applied to all PUCCH resources in the PUCCH resource set including the corresponding PUCCH resource, or ii) Method 1 may be applied only to the PUCCH configured for ACK/NACK, or iii) Method 1 may be applied to the PUCCH configured for ACK/NACK and SR.

In this case, iii) may be regarded as applying Method 1 to the remaining PUCCH resources excluding the PUCCH resources for CSI reporting.

In the PUCCH resource for CSI reporting, Method 1 may not be applied. This is because, in the beam failure state, even if the CSI information is transmitted to the BS, the CSI was measured based on a serving beam before the beam failure and thus the beam may have low importance.

In addition, the necessity of applying the above method to the PUCCH resources for CSI is weak, and the CSI reporting PUCCH may be intentionally set to correspond to different TRP/gNB or TRP's Rx panel/beam for each PUCCH resource.

Next, a method of configuring a PUSCH beam will be described.

If the beam used for the current PUSCH transmission is scheduled with the current fallback DCI (i.e., DCI format 0_0), it is configured to follow a beam of the PUCCH resource corresponding to the lowest ID among the PUCCH resources in an active UL bandwidth of the corresponding cell.

As for the beam used for the current PUSCH transmission, in the case of using DCI format 0_1, a beam used for the transmission of the SRS resource indicated by an SRI field in the codebook based uplink transmission and a non-codebook based uplink transmission scheme is configured to e used for corresponding PUSCH transmission.

However, when DCI format 0_0 is used, there is a problem that a probability that the lowest ID PUCCH beam is not an optimal beam is high. Msg.2 and subsequent DCIs for contention-free random access (CFRA)-based BFRQ may be transmitted in a BFR search space (Method 2)

A UE that receives DCI format 0_0 from the BS in the BFR search space may make the transmission beam for the PUSCH allocated by the DCI the same as the transmission beam used for the PRACH that sent the BFRQ. Here, the PRACH may be the most recently transmitted PRACH.

Meanwhile, when the UE receives the DCI format 0_0 from the BS in a user specific search space other than the BFR search space, the UE may use the PUCCH beam of the lowest ID.

Here, the BFR search space and the user specific search space may be searched using the same RNTI (C-RNTI).

When the DCI transmitted by the BS uses format 1_0, there is a problem in that the beam used for SRS resource transmission indicated by SRI is not an optimal beam.

In order to solve this problem, the same beam used for PRACH transmission as in Method 2 may be used for SRS resource transmission.

(Method 3)

The UE, which has received the DCI format 0_1 in the BFR search space, may use the same beam as the PRACH transmission beam that transmits a beam for transmitting the PUSCH allocated by the DCI to the BS for the BFRQ.

Meanwhile, another method is to search for precoding/beamforming of an aperiodic (AP) SRS based on the new beam RS detected by the UE in the BFR process and transmit the same. The SRS may be a codebook-based transmission or a non-codebook-based transmission SRS that is directly related to PUSCH transmission when an SRS resource set usage is configured to be codebook-based or non-codebook-based through RRC.

Meanwhile, since the AP SRS may also be triggered with DCI format 1_1, the BS may use DCI format 1_1 in transmitting the DCI to the UE.

(Method 4)

The UE receiving an AP SRS trigger request through a DCI transmitted from a BS in a BFR search space automatically sets spatial relation information of the SRS resource(s) to a new beam RS (e.g., CSI-RS or SSB).

In this case, the DCI transmitted by the BS may be DCI format 0_1 or DCI format 1_1, and the new beam RS may be a beam used for PRACH transmission most recently transmitted by the UE to the BS.

The spatial relation information of the SRS may be designated as one of an SRS resource ID, an SSB resource ID, and a CSI-RS resource ID like the PUCCH. When method 4 described above is applied, the spatial relation information of the SRS triggered through the BFR search space may be automatically configured as an SSB resource ID or a CSI-RS resource ID which is a new beam RS. In this case, the information may be automatically set regardless of predetermined spatial relation information.

Method 4 described above may be configured to be always applied when the UE receives SRS triggering in the BFR search space, may be applied only at a timepoint of first SRS transmission transmitted first after transmission of the PRACH to the BS, or may be continuously applied until the spatial relation information on the SRS resource is separately updated by a BS indication.

When Method 4 is applied, an SRI field for performing a precoding indication on a subsequent PUSCH may be performed based on the AP SRS resource. In order to perform this more efficiently, when a PUSCH is scheduled for codebook-based or non-codebook-based transmission through a BFR search space (e.g., DCI format 0_1), the information indicated by the SRI of the DCI may be configured as information for the AP SRS resource(s).

Here, it may be configured regardless of the information on the resource(s) established through the existing RRC. That is, Method 4 is to perform PUSCH precoding/beamforming through AP SRS resource(s) triggered through the DCI transmitted from the BS in the BFR search space instead of the predetermined SRS resource.

In Method 1, after the UE transmits the PRACH (which may be a contention-free-based PRACH) for the BFRQ to the BS, the UE receives the DCI in the BFR search space, and configures a transmission (spatial domain filter) of the PUCCH resource transmitting HARQ-ACK/NACK for the PDSCH allocated by the DCI to be the same as the PRACH transmission beam or to have the same spatial relation information.

Here, the DCI received by the UE may be DCI format 1_0 or DCI format 1_1.

In this case, Method 1 may be applied to a specific PUCCH resource or a PUCCH resource set for transmitting the ACK/NACK.

Hereinafter, a method of configuring to which PUCCH resource the same beam (or the same spatial relation) as the PRACH is to be applied will be described.

Here, the PUCCH resource to which the same beam as the PRACH is applied may be adaptively applied by i) capability of the UE or ii) indication/configuration of the BS.

In particular, Methods 1 to 4 described above relate to that the PUCCH transmitted to the BS after the UE transmits the PRACH uses the same beam as the beam used for the PRACH transmission.

Since the BS transmits the DCI when the BS normally receives the PRACH transmitted by the UE, if the UE receives the DCI normally, the beam used for transmission of the PRACH may be recognized as maintaining the beam connection.

Here, i) In the PUCCH, the same beam as the PRACH may be applied to all PUCCH resources transmitted in the component carrier and/or bandwidth part used for PRACH transmission.

In other words, the PUCCH may be transmitted in the same cell as the cell used for the PRACH transmission. That is, instead of changing the beams of all PUCCHs transmitted by the UE, only the PUCCHs included in the same cell as the PRACH are changed.

This means that if beam failure is detected for some of the beams set for each PUCCH resource, changing the beams of all the PUCCH resources may increase redundancy, and changing of beams configured for other purposes involves complexity such as configuring the beams to the predetermined purpose again, and thus, it may be effective to change only the PUCCHs included in the same cell as the PRACH.

ii) Meanwhile, the same beam as the PRACH may be applied only to the ACK/NACK PUCCH resource for the PDSCH scheduled through the DCI received in the BFR search space transmitted by the BS.

Each of the methods i) and ii) has advantages and disadvantages depending on the UE/BS implementation/operation method.

In the case of i), a UE implemented based on a single UE transmission beam and/or communication with the corresponding UE may be more suitable for a single BS/TRP reception beam based operation scheme. That is, it is more preferable that the corresponding UE maintains one transmission beam at a time and change all uplink beams when it is necessary to change the uplink beam pair due to beam failure. If ii) is applied to such a UE, a process of reconfiguring beams of other PUCCH resources is required after beam failure recovery, but a process of reconfiguring beams of other PUCCH resources is unnecessary, if i) is applied.

In the case of ii), as described above, since some of the predetermined PUCCH beams may still be valid beams in a situation in which a beam failure occurs in a multi-UE beam or a multi-BS reception beam scenario, it is more appropriate in the multi-UE beam or a multi-BS reception beam scenario.

As described above, the methods i) and ii) have advantages and disadvantages, and thus, it may be desirable to apply either i) or ii) according to the UE based on reporting on a preferred method of the UE, reporting on capability of the UE related to the number of applicable PUCCH beams, or a configuration/indication of the UE.

In this case, the capability of the UE may be replaced by the total number of active spatial relation information for the PUCCH, and here, the active spatial relation information refers to spatial relation information finally selected and indicated by MAC CE or RRC for the PUCCH resource. In the method of configuring/indicating by the BS, which of the methods is to be applied by each UE may be determined in consideration of both semi-statically configuring method and a dynamically configuring method.

Here, the semi-statically configuring method may be set by an RRC message, and the dynamically configuring method may be set by DCI or MAC-CE.

As one of the dynamically indicating method, the UE receives a DCI having a format of 1_0 or 1_1 in the BFR search space.

Here, the BS delivers a MAC message to the UE through the PDSCH scheduled by the DCI, and the corresponding MAC message may include whether to change all subsequent PUCCH beams to the PRACH beam transmitted by the UE ((i) method) or whether to change only the beam for specific PUCCH resource(s) ((ii) method).

The PUCCH spatial relation information for a specific PUCCH resource may be indicated or updated using the MAC-CE. If the PUCCH resource (set) ID field is indicated by a specific agreed value (e.g., all set to zero) or if the field does not exist, the corresponding MAC message may be used to indicate or update the spatial relation information of all PUCCH resources.

In addition, if the spatial relation information field is indicated to a specific agreed value (e.g., all set to zero) or if the corresponding field does not exist in the corresponding MAC message, the same beam as the most recently transmitted PRACH beam (or the same spatial relation) may be instructed to be applied.

Here, a specific PUCCH resource or all PUCCH resources may be transmitted using the same beam as the PRACH beam, and the PRACH may be transmitted on a contention-free basis for BRFQ purposes.

The MAC message applied to the scheme may be a MAC message through PDSCH which is specifically scheduled through a specific search space such as the BFR search space.

Each embodiment or each method described above may be performed separately or may be implemented through a combination of one or more embodiments or methods to implement the method proposed in the present disclosure.

Figure 14:
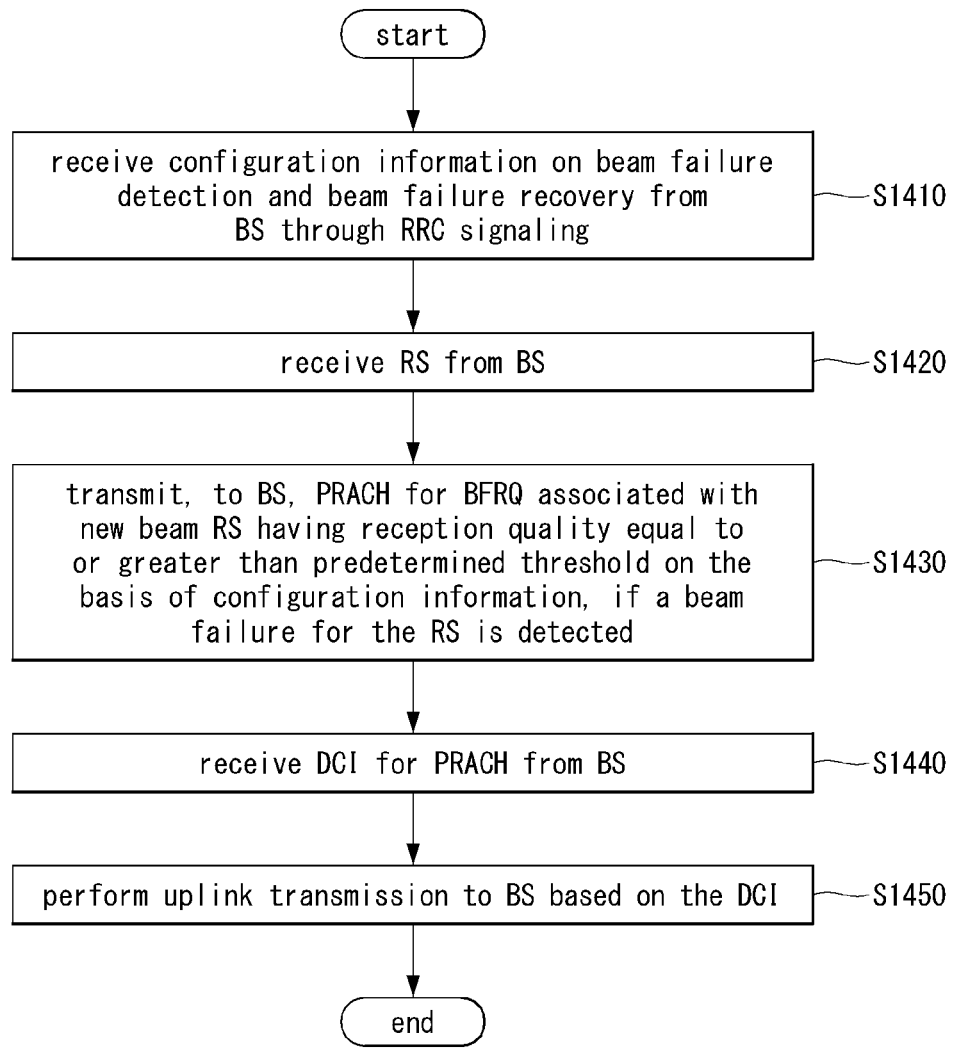
FIG. 14 is a flowchart illustrating a method of performing uplink transmission proposed in the present disclosure.

FIG. 14 is a flowchart illustrating a method of performing uplink transmission proposed in the present disclosure.

That is, FIG. 14 illustrates an operation method of a UE that performs a method of transmitting uplink in a wireless communication system.

First, the UE receives configuration information on beam failure detection and beam failure recovery through RRC signaling (S1410).

The UE receives a reference signal (RS) from the BS (S1420).

If the UE detects a beam failure for the RS, the UE transmits, to the BS, a PRACH for a beam failure recovery request (BFRQ) related with a new beam RS having a reception quality equal to or greater than a predetermined threshold based on the configuration information (S1430).

The UE receives, from the BS, downlink control information (DCI) for the PRACH (S1440).

Here, the DCI may be received in a beam failure recovery (BFR) search space for searching for a response to the PRACH.

The UE performs uplink transmission to the BS based on the DCI (S1450).

In this case, the uplink transmission may be performed using the same spatial filter as the spatial filter used for transmission of the PRACH.

In this case, the uplink transmission is performed on the same CC or the same BWP as a component carrier (CC) or a bandwidth part (BWP) that transmits the PRACH.

Here, step S1430 may include: counting the number of times of a beam failure for the RS received at least once, the number of times being a number when reception quality of the RS received at least once is equal to or lower than a predetermined reference value; and transmitting a PRACH for a BFRQ related with a new beam RS having a reception quality equal to or higher than a predetermined threshold based on the configuration information, if the number of times of beam failure is equal to or greater than a predetermined value.

The uplink transmission may be a PUCCH transmission using some of a plurality of predetermined resources, and the some resources may be configured based on capability of the UE or configured by indication information received from the BS.

The DCI may include a sounding reference signal (SRS) trigger request.

The uplink transmission may be a transmission of physical uplink control channel (PUCCH) including HARQ-ACK/NACK information on the DCI, and a format of the DCI may be DCI format 1_0 or DCI format 1_1.

The uplink transmission may be a transmission of physical uplink shared channel (PUSCH), and a format of the DCI may be DCI format 0_0 or DCI format 0_1.

Contents that the method for performing an uplink transmission proposed in the present disclosure is implemented in a UE will be described with reference to FIGS. 16 and 17.

A UE for performing an uplink transmission in a wireless communication system may include: a radio frequency (RF) module transmitting and receiving a radio signal; and a processor functionally connected to the RF module.

First, the processor of the UE controls the RF module to receive configuration information on beam failure detection and beam failure recovery from a BS through RRC signaling.

The processor controls the RF module to receive a reference signal (RS).

When the beam failure for the RS, is detected the processor controls the RF module to transmit a PRACH for a beam failure recovery request (BFRQ) related with a new beam RS having a reception quality equal to or greater than a predetermined threshold to the BS based on the configuration information.

The processor controls the RF module to receive downlink control information (DCI) for the PRACH from the BS.

In this case, the DCI may be received in a beam failure recovery (BFR) search space for searching for a response to the PRACH.

The processor controls the RF module to perform uplink transmission to the BS on the basis of the DCI.

The uplink transmission is performed on the same component carrier (CC) or the same bandwidth part (BWP) as a CC or BWP that transmits the PRACH.

The processor may control the RF module to count the number of times of a beam failure for the RS received at least once.

In this case, the number of times of the beam failure may be a number of times when a reception quality of the RS received at least once is equal to or less than a predetermined reference value.

If the number of times of the beam failure is equal to or greater than the predetermined value, the processor may control the RF module to transmit, to the BS, a PRACH for a BFRQ related with a new beam RS having a reception quality equal to or greater than a predetermined threshold based on the configuration information.

In this case, the uplink transmission may be a PUCCH transmission using some of a plurality of predetermined resources, and the some resources may be configured based on capability of the UE or configured by indication information received from the BS.

In this case, the DCI may include a sounding reference signal (SRS) trigger request.

The uplink transmission may be a transmission of physical uplink control channel (PUCCH) including HARQ-ACK/NACK information on the DCI, and a format of the DCI may be DCI format 1_0 or DCI format 1_1.

The uplink transmission may be a transmission of physical uplink shared channel (PUSCH), and a format of the DCI may be DCI format 0_0 or DCI format 0_1.

Figure 15:
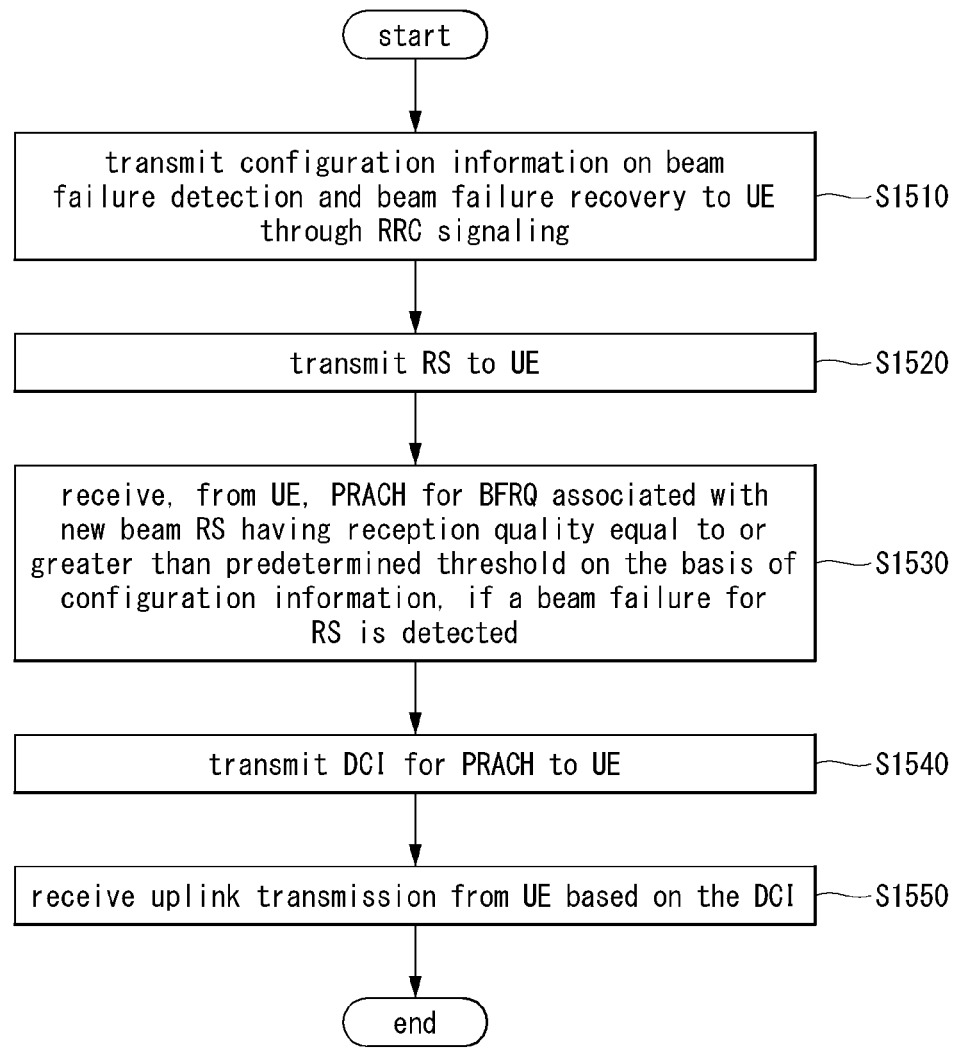
FIG. 15 is a flowchart illustrating a method of performing uplink reception proposed in the present disclosure.

FIG. 15 is a flowchart illustrating a method of performing uplink reception proposed in the present disclosure.

That is, FIG. 15 illustrates an operation method of a BS for performing an uplink reception from a UE in a wireless communication system.

First, the BS transmits configuration information on beam failure detection and beam failure recovery to a UE through RRC signaling (S1510).

The BS transmits a reference signal (RS) to the UE (S1520).

If beam failure for the RS is detected, the BS receives, from the UE, a PRACH for a beam failure recovery request (BFRQ) related with a new beam RS having a reception quality equal to or greater than a predetermined threshold based on the configuration information (S1530).

The BS transmits downlink control information (DCI) for the PRACH to the UE (S1540).

In this case, the DCI may be transmitted in a beam failure recovery (BFR) search space in which a response to the PRACH is searched.

The BS performs uplink reception, from the UE, based on the DCI (S1550).

In this case, the uplink reception may be performed using the same spatial filter as the spatial filter used for transmission of the PRACH.

In this case, the uplink reception may be performed on the same component carrier (CC) or the same bandwidth part (BWP) as a CC or a BWP that transmits the PRACH.

The uplink reception may be to receive a PUCCH transmitted using some of a plurality of predetermined resources, and the some resources may be configured on the basis of capability of the UE or configured by indication information received from the BS.

The DCI may include a sounding reference signal (SRS) trigger request.

The uplink reception may be to receive a physical uplink control channel (PUCCH) including HARQ-ACK/NACK information on the DCI, and a format of the DCI may be DCI format 1_0 or DCI format 1_1.

The uplink reception may be to receive a physical uplink shared channel (PUSCH), and a format of the DCI may be DCI format 0_0 or DCI format 0_1.

Contents of an operation of performing an uplink reception from a UE in a wireless communication system proposed in the present disclosure will be described with reference to FIGS. 16 and 17.

A BS for performing an uplink transmission in a wireless communication system may include: a radio frequency (RF) module transmitting and receiving a radio signal; and a processor functionally connected to the RF module.

First, the processor of the BS controls the RF module to transmit configuration information for beam failure detection and beam failure recovery to a UE through RRC signaling.

The processor controls the RF module to transmit a reference signal (RS) to the UE.

If beam failure for the RS is detected, the processor controls the RF module to receive, from the UE, a PRACH for a beam failure recovery request (BFRQ) related with a new beam RS having a reception quality equal to or greater than a predetermined threshold on the basis of the configuration information.

The processor controls the RF module to transmit downlink control information (DCI) for the PRACH to the UE.

In this case, the DCI may be transmitted in a beam failure recovery (BFR) search space for searching for a response to the PRACH.

The processor controls the RF module to perform an uplink reception based on the DCI from the UE.

In this case, the uplink reception may be performed using the same spatial filter as a spatial filter used for transmission of the PRACH.

In this case, the uplink reception may be performed on the same component carrier (CC) or the same bandwidth part (BWP) as a CC or BWP that transmits the PRACH.

The uplink reception may be to receive a PUCCH transmitted using some of a plurality of predetermined resources, and the some resources may be configured on the basis of capability of the UE or configured by indication information received from the BS.

The DCI may include a sounding reference signal (SRS) trigger request.

The uplink reception may be to receive a physical uplink control channel (PUCCH) including HARQ-ACK/NACK information on the DCI, and a format of the DCI may be DCI format 1_0 or DCI format 1_1.

The uplink reception may be to receive a physical uplink shared channel (PUSCH), and a format of the DCI may be DCI format 0_0 or DCI format 0_1.

Overview of Device to which the Present Disclosure is Applied

Hereinafter, a device to which the present disclosure may be applied is described.

Figure 16:
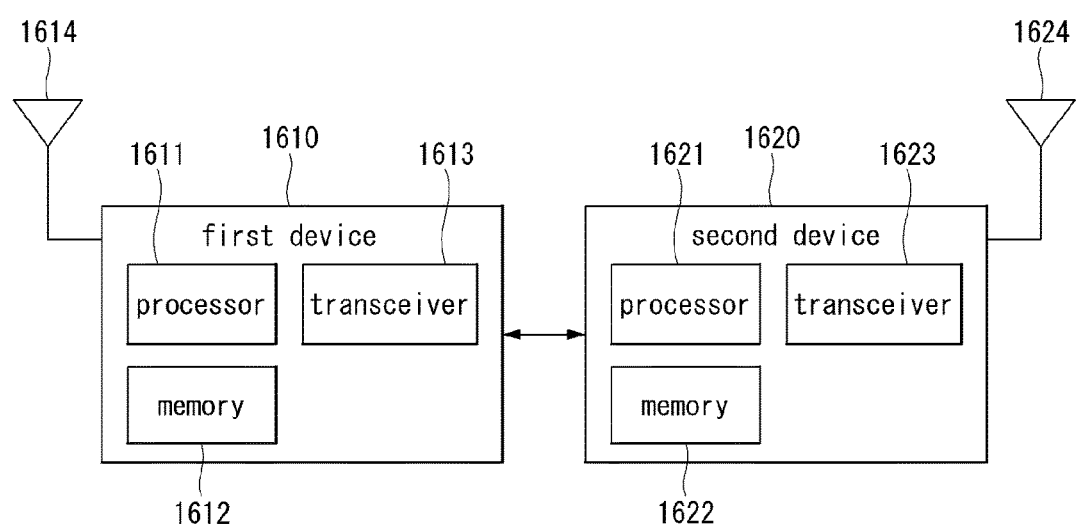
FIG. 16 illustrates a block diagram of a wireless communication device to which the methods proposed in this disclosure may be applied.

FIG. 16 illustrates a block diagram of a wireless communication device to which methods proposed in this specification may be applied.

Referring to FIG. 16, a wireless communication system may include a first device 1610 and a second device 1620.

The first device 1610 may be a device related to a base station, a network node, a transmission user equipment (UE), a reception UE, a radio device, a wireless communication device, a vehicle, a vehicle on which a self-driving function is mounted, a connected car, a drone (unmanned aerial vehicle (UAV)), an artificial intelligence (AI) module, a robot, an augmented reality (AR) device, a virtual reality (VR) device, a mixed reality (MR) device, a hologram device, a public safety device, an MTC device, an IoT device, a medical device, a FinTech device (or financial device), a security device, a climate/environment device, a device related to 5G service or a device related to the fourth industrial revolution field in addition to the devices.

The second device 1620 may be a device related to a base station, a network node, a transmission UE, a reception UE, a radio device, a wireless communication device, a vehicle, a vehicle on which a self-driving function is mounted, a connected car, a drone (unmanned aerial vehicle (UAV)), an artificial intelligence (AI) module, a robot, an augmented reality (AR) device, a virtual reality (VR) device, a mixed reality (MR) device, a hologram device, a public safety device, an MTC device, an IoT device, a medical device, a FinTech device (or financial device), a security device, a climate/environment device, a device related to 5G service or a device related to the fourth industrial revolution field in addition to the devices.

For example, the UE may include a portable phone, a smart phone, a laptop computer, a terminal for digital broadcasting, a personal digital assistants (PDA), a portable multimedia player (PMP), a navigator, a slate PC, a tablet PC, an ultrabook, a wearable device (e.g., a watch type terminal (smartwatch), a glass type terminal (smart glass), a head mounted display (HMD)), and so on. For example, the HMD may be a display device of a form, which is worn on the head. For example, the HMD may be used to implement VR, AR or MR.

For example, the drone may be a flight vehicle that flies by a wireless control signal without a person being on the flight vehicle. For example, the VR device may include a device implementing the object or background of a virtual world. For example, the AR device may include a device implementing the object or background of a virtual world by connecting it to the object or background of the real world. For example, the MR device may include a device implementing the object or background of a virtual world by merging it with the object or background of the real world. For example, the hologram device may include a device implementing a 360-degree stereographic image by recording and playing back stereographic information using the interference phenomenon of a light beam generated when two lasers called holography are met. For example, the public safety device may include a video relay device or an imaging device capable of being worn on a user's body. For example, the MTC device and the IoT device may be a device that does not require a person's direct intervention or manipulation. For example, the MTC device and the IoT device may include a smart meter, a vending machine, a thermometer, a smart bulb, a door lock or a variety of sensors. For example, the medical device may be a device used for the purpose of diagnosing, treating, reducing, handling or preventing a disease. For example, the medical device may be a device used for the purpose of diagnosing, treating, reducing or correcting an injury or obstacle. For example, the medical device may be a device used for the purpose of testing, substituting or modifying a structure or function. For example, the medical device may be a device used for the purpose of controlling pregnancy. For example, the medical device may include a device for medical treatment, a device for operation, a device for (external) diagnosis, a hearing aid or a device for a surgical procedure. For example, the security device may be a device installed to prevent a possible danger and to maintain safety. For example, the security device may be a camera, CCTV, a recorder or a blackbox. For example, the FinTech device may be a device capable of providing financial services, such as mobile payment. For example, the FinTech device may include a payment device or point of sales (POS). For example, the climate/environment device may include a device for monitoring or predicting the climate/environment.

The first device 1610 may include at least one processor such as a processor 1611, at least one piece of memory such as memory 1612, and at least one transceiver such as a transceiver 1613. The processor 1611 may perform the above-described functions, procedures, and/or methods. The processor 1611 may perform one or more protocols. For example, the processor 1611 may perform one or more layers of a radio interface protocol. The memory 1612 is connected to the processor 1611, and may store various forms of information and/or instructions. The transceiver 1613 is connected to the processor 1611, and may be controlled to transmit and receive radio signals.

The second device 1620 may include at least one processor such as a processor 1621, at least one piece of memory device such as memory 1622, and at least one transceiver such as a transceiver 1623. The processor 1621 may perform the above-described functions, procedures and/or methods. The processor 1621 may implement one or more protocols. For example, the processor 1621 may implement one or more layers of a radio interface protocol. The memory 1622 is connected to the processor 1621, and may store various forms of information and/or instructions. The transceiver 1623 is connected to the processor 1621 and may be controlled transmit and receive radio signals.

The memory 1612 and/or the memory 1622 may be connected inside or outside the processor 1611 and/or the processor 1621, respectively, and may be connected to another processor through various technologies, such as a wired or wireless connection.

The first device 1610 and/or the second device 1620 may have one or more antennas. For example, the antenna 1614 and/or the antenna 1624 may be configured to transmit and receive radio signals.

Figure 17:
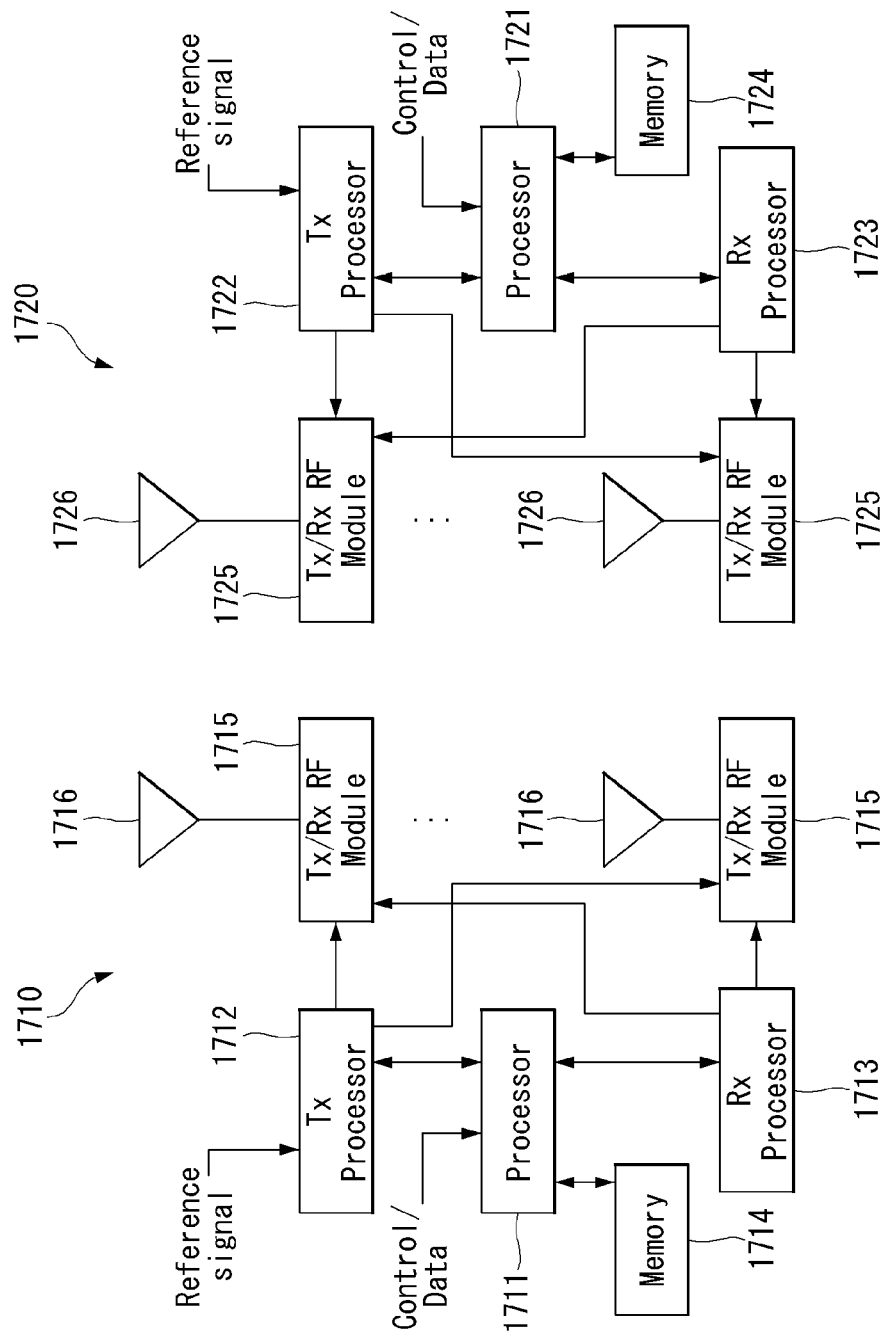
FIG. 17 illustrates another example of a block diagram of a wireless communication device to which the methods proposed in this disclosure may be applied.

FIG. 17 illustrates another block diagram of a wireless communication device to which methods proposed in this specification may be applied.

Referring to FIG. 17, the wireless communication system includes a base station 1710 and multiple terminals 1720 disposed within the base station region. The base station may be represented as a transmission device, and the terminal may be represented as a reception device, and vice versa. The base station and the terminal include processors 1711 and 1721, memory 1714 and 1724, one or more Tx/Rx radio frequency (RF) modules 1715 and 1725, Tx processors 1712 and 1722, Rx processors 1713 and 1723, and antennas 1716 and 1726, respectively. The processor implements the above-described functions, processes and/or methods. More specifically, in DL (communication from the base station to the terminal), a higher layer packet from a core network is provided to the processor 1711. The processor implements the function of the L2 layer. In DL, the processor provides the terminal 1720 with multiplexing between a logical channel and a transport channel and radio resource allocation, and is responsible for signaling toward the terminal. The transmission (TX) processor 1712 implements various signal processing functions for the L1 layer (i.e., physical layer). The signal processing function facilitates forward error correction (FEC) in the terminal, and includes coding and interleaving. A coded and modulated symbol is split into parallel streams. Each stream is mapped to an OFDM subcarrier and multiplexed with a reference signal (RS) in the time and/or frequency domain. The streams are combined using inverse fast Fourier transform (IFFT) to generate a physical channel that carries a time domain OFDMA symbol stream. The OFDM stream is spatially precoded in order to generate multiple space streams. Each space stream may be provided to a different antenna 1716 through an individual Tx/Rx module (or transmitter and receiver 1715). Each Tx/Rx module may modulate an RF carrier into each space stream for transmission. In the terminal, each Tx/Rx module (or transmitter and receiver 1725) receives a signal through each antenna 1726 of each Tx/Rx module. Each Tx/Rx module restores information modulated in an RF carrier and provides it to the RX processor 1723. The RX processor implements various signal processing functions of the layer 1. The RX processor may perform space processing on information in order to restore a given space stream toward the terminal. If multiple space streams are directed toward the terminal, they may be combined into a single OFDMA symbol stream by multiple RX processors. The RX processor converts the OFDMA symbol stream from the time domain to the frequency domain using fast Fourier transform (FFT). The frequency domain signal includes an individual OFDMA symbol stream for each subcarrier of an OFDM signal. Symbols on each subcarrier and a reference signal are restored and demodulated by determining signal deployment points having the best possibility, which have been transmitted by the base station. Such soft decisions may be based on channel estimation values. The soft decisions are decoded and deinterleaved in order to restore data and a control signal originally transmitted by the base station on a physical channel. A corresponding data and control signal are provided to the processor 1721.

UL (communication from the terminal to the base station) is processed by the base station 1710 in a manner similar to that described in relation to the receiver function in the terminal 1720. Each Tx/Rx module 1725 receives a signal through each antenna 1726. Each Tx/Rx module provides an RF carrier and information to the RX processor 1723. The processor 1721 may be related to the memory 1724 storing a program code and data. The memory may be referred to as a computer-readable medium.

Communication System Applied to the Present Disclosure

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 18:
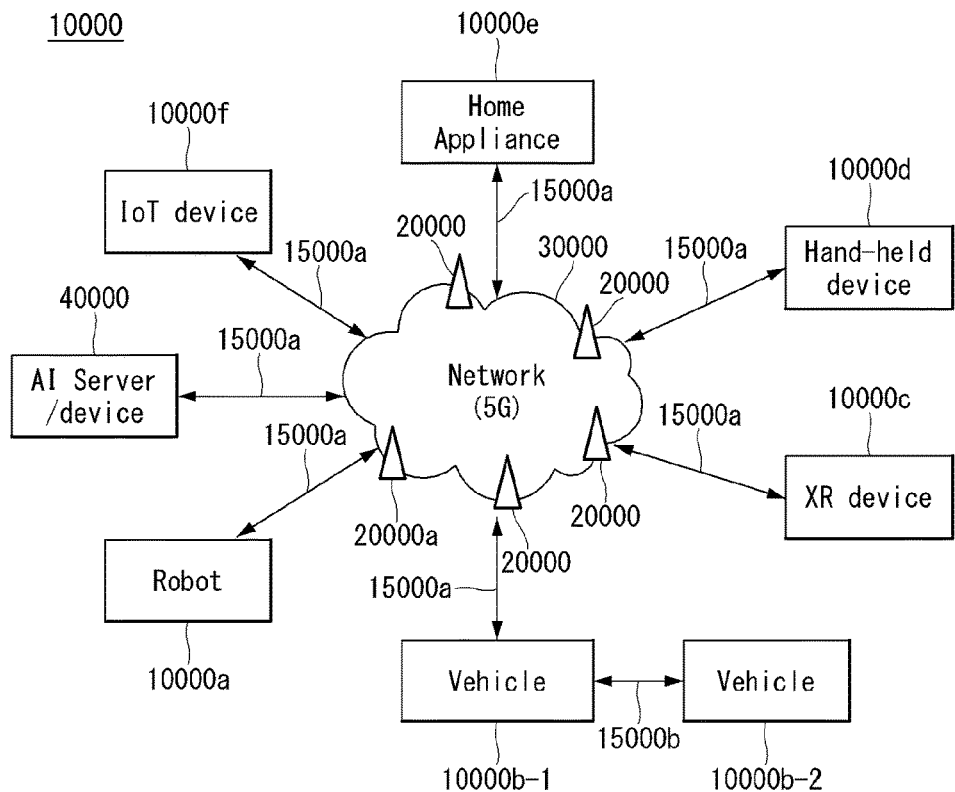
FIG. 18 illustrates an example of a communication system that may be applied to the present disclosure.

FIG. 18 illustrates a communication system 10000 applied to the present disclosure.

Referring to FIG. 18, a communication system 10000 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 10000a, vehicles 10000b-1 and 10000b-2, an eXtended Reality (XR) device 10000c, a hand-held device 10000d, a home appliance 10000e, an Internet of Things (IoT) device 10000f, and an Artificial Intelligence (AI) device/server 40000. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 20000a may operate as a BS/network node with respect to other wireless devices.

The wireless devices 10000a to 10000f may be connected to the network 30000 via the BSs 20000. An AI technology may be applied to the wireless devices 10000a to 10000f and the wireless devices 10000a to 10000f may be connected to the AI server 40000 via the network 30000. The network 30000 may be configured using a 3G network, a 4G (e.g., LTE) network, or a 5G (e.g., NR) network. Although the wireless devices 10000a to 10000f may communicate with each other through the BSs 20000/network 30000, the wireless devices 10000a to 10000f may perform direct communication (e.g., sidelink communication) with each other without passing through the BSs/network. For example, the vehicles 10000b-1 and 10000b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 10000a to 10000f.

Wireless communication/connections 15000a, 15000b, or 15000c may be established between the wireless devices 10000a to 10000f/BS 20000, or BS 20000/BS 20000. Herein, the wireless communication/connections may be established through various RATs (e.g., 5G NR) such as uplink/downlink communication 15000a, sidelink communication 15000b (or, D2D communication), or inter BS communication (e.g. relay, Integrated Access Backhaul (IAB)). The wireless devices and the BSs/the wireless devices may transmit/receive radio signals to/from each other through the wireless communication/connections 15000a and 15000b. For example, the wireless communication/connections 15000a and 15000b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Devices Applicable to the Present Disclosure

Figure 19:
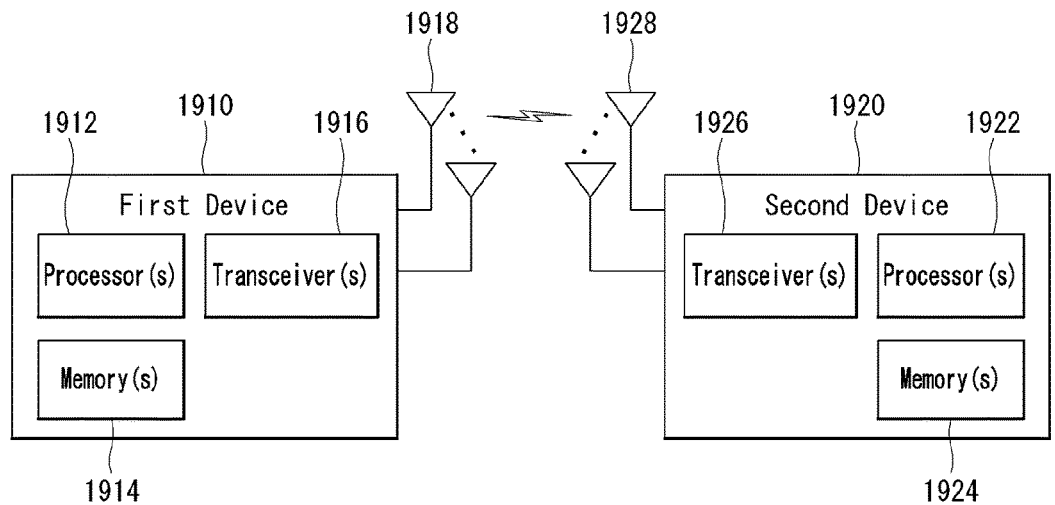
FIG. 19 shows an example of a wireless device that may be applied to the present disclosure.

FIG. 19 illustrates wireless devices applicable to the present disclosure.

Referring to FIG. 19, a first wireless device 1910 and a second wireless device 1920 may transmit radio signals through a variety of RATs (e.g., LTE and NR). Herein, {the first wireless device 1910 and the second wireless device 1920} may correspond to {the wireless device 10000x and the BS 20000} and/or {the wireless device 10000x and the wireless device 10000x} of FIG. 18.

The first wireless device 1910 may include one or more processors 1912 and one or more memories 1914 and additionally further include one or more transceivers 1916 and/or one or more antennas 1918. The processor(s) 1912 may control the memory(s) 1914 and/or the transceiver(s) 1916 and may be configured to implement the descriptions, functions, procedures, proposals, methods, and/or operational flowcharts disclosed in this document. For example, the processor(s) 1912 may process information within the memory(s) 1914 to generate first information/signals and then transmit radio signals including the first information/signals through the transceiver(s) 1916. The processor(s) 1912 may receive radio signals including second information/signals through the transceiver 1916 and then store information obtained by processing the second information/signals in the memory(s) 1914. The memory(s) 1914 may be connected to the processor(s) 1912 and may store a variety of information related to operations of the processor(s) 1912. For example, the memory(s) 1914 may store software code including commands for performing a part or the entirety of processes controlled by the processor(s) 1912 or for performing the descriptions, functions, procedures, proposals, methods, and/or operational flowcharts disclosed in this document. Herein, the processor(s) 1912 and the memory(s) 1914 may be a part of a communication modem/circuit/chip designed to implement RAT (e.g., LTE or NR). The transceiver(s) 1916 may be connected to the processor(s) 1912 and transmit and/or receive radio signals through one or more antennas 1918. Each of the transceiver(s) 1916 may include a transmitter and/or a receiver. The transceiver(s) 1916 may be interchangeably used with Radio Frequency (RF) unit(s). In the present disclosure, the wireless device may represent a communication modem/circuit/chip.

The second wireless device 1920 may include one or more processors 1922 and one or more memories 1924 and additionally further include one or more transceivers 1926 and/or one or more antennas 1928. The processor(s) 1922 may control the memory(s) 1924 and/or the transceiver(s) 1926 and may be configured to implement the descriptions, functions, procedures, proposals, methods, and/or operational flowcharts disclosed in this document. For example, the processor(s) 1922 may process information within the memory(s) 1924 to generate third information/signals and then transmit radio signals including the third information/signals through the transceiver(s) 1926. The processor(s) 1922 may receive radio signals including fourth information/signals through the transceiver(s) 1926 and then store information obtained by processing the fourth information/signals in the memory(s) 1924. The memory(s) 1924 may be connected to the processor(s) 1922 and may store a variety of information related to operations of the processor(s) 1922. For example, the memory(s) 1924 may store software code including commands for performing a part or the entirety of processes controlled by the processor(s) 1922 or for performing the descriptions, functions, procedures, proposals, methods, and/or operational flowcharts disclosed in this document. Herein, the processor(s) 1922 and the memory(s) 1924 may be a part of a communication modem/circuit/chip designed to implement RAT (e.g., LTE or NR). The transceiver(s) 1926 may be connected to the processor(s) 1922 and transmit and/or receive radio signals through one or more antennas 1928. Each of the transceiver(s) 1926 may include a transmitter and/or a receiver. The transceiver(s) 1926 may be interchangeably used with RF unit(s). In the present disclosure, the wireless device may represent a communication modem/circuit/chip.

Hereinafter, hardware elements of the wireless devices 1910 and 1920 will be described more specifically. One or more protocol layers may be implemented by, without being limited to, one or more processors 1912 and 1922. For example, the one or more processors 1912 and 1922 may implement one or more layers (e.g., functional layers such as PHY, MAC, RLC, PDCP, RRC, and SDAP). The one or more processors 1912 and 1922 may generate one or more Protocol Data Units (PDUs) and/or one or more Service Data Unit (SDUs) according to the descriptions, functions, procedures, proposals, methods, and/or operational flowcharts disclosed in this document. The one or more processors 1912 and 1922 may generate messages, control information, data, or information according to the descriptions, functions, procedures, proposals, methods, and/or operational flowcharts disclosed in this document. The one or more processors 1912 and 1922 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 1916 and 1926. The one or more processors 1912 and 1922 may receive the signals (e.g., baseband signals) from the one or more transceivers 1916 and 1926 and acquire the PDUs, SDUs, messages, control information, data, or information according to the descriptions, functions, procedures, proposals, methods, and/or operational flowcharts disclosed in this document.

The one or more processors 1912 and 1922 may be referred to as controllers, microcontrollers, microprocessors, or microcomputers. The one or more processors 1912 and 1922 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 1912 and 1922. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 1912 and 1922 or stored in the one or more memories 1914 and 1924 so as to be driven by the one or more processors 1912 and 1922. The descriptions, functions, procedures, proposals, methods, and/or operational flowcharts disclosed in this document may be implemented using firmware or software in the form of code, commands, and/or a set of commands.

The one or more memories 1914 and 1924 may be connected to the one or more processors 1912 and 1922 and store various types of data, signals, messages, information, programs, code, instructions, and/or commands. The one or more memories 1914 and 1924 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 1914 and 1924 may be located at the interior and/or exterior of the one or more processors 1912 and 1922. The one or more memories 1914 and 1924 may be connected to the one or more processors 1912 and 1922 through various technologies such as wired or wireless connection.

The one or more transceivers 1916 and 1926 may transmit user data, control information, and/or radio signals/channels, mentioned in the methods and/or operational flowcharts of this document, to one or more other devices. The one or more transceivers 1916 and 1926 may receive user data, control information, and/or radio signals/channels, mentioned in the descriptions, functions, procedures, proposals, methods, and/or operational flowcharts disclosed in this document, from one or more other devices. For example, the one or more transceivers 1916 and 1926 may be connected to the one or more processors 1912 and 1922 and transmit and receive radio signals. For example, the one or more processors 1912 and 1922 may perform control so that the one or more transceivers 1916 and 1926 may transmit user data, control information, or radio signals to one or more other devices. The one or more processors 1912 and 1922 may perform control so that the one or more transceivers 1916 and 1926 may receive user data, control information, or radio signals from one or more other devices. The one or more transceivers 1916 and 1926 may be connected to the one or more antennas 1918 and 1928 and the one or more transceivers 1916 and 1926 may be configured to transmit and receive user data, control information, and/or radio signals/channels, mentioned in the descriptions, functions, procedures, proposals, methods, and/or operational flowcharts disclosed in this document, through the one or more antennas 1918 and 1928. In this document, the one or more antennas may be a plurality of physical antennas or a plurality of logical antennas (e.g., antenna ports). The one or more transceivers 1916 and 1926 may convert received radio signals/channels etc. from RF band signals into baseband signals in order to process received user data, control information, radio signals/channels, etc. using the one or more processors 1912 and 1922. The one or more transceivers 1916 and 1926 may convert the user data, control information, radio signals/channels, etc. processed using the one or more processors 1912 and 1922 from the base band signals into the RF band signals. To this end, the one or more transceivers 1916 and 1926 may include (analog) oscillators and/or filters.

Example of a Wireless Device Applied to the Present Disclosure

Figure 20:
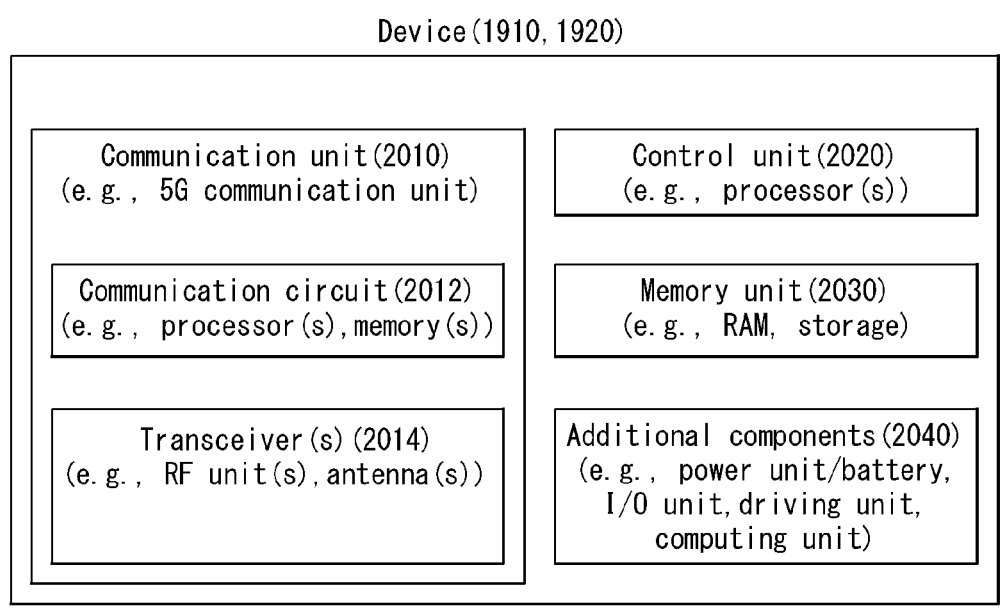
FIG. 20 shows another example of a wireless device that may be applied to the present disclosure.

FIG. 20 illustrates another example of a wireless device applied to the present disclosure. The wireless device may be implemented in various forms according to a use-case/service (refer to FIG. 18).

Referring to FIG. 20, wireless devices 1910 and 1920 may correspond to the wireless devices 1910 and 1920 of FIG. 19 and may be configured by various elements, components, units/portions, and/or modules. For example, each of the wireless devices 1910 and 1920 may include a communication unit 2010, a control unit 2020, a memory unit 2030, and additional components 2040. The communication unit may include a communication circuit 2012 and transceiver(s) 2014. For example, the communication circuit 2012 may include the one or more processors 1912 and 1922 and/or the one or more memories 1914 and 1924 of FIG. 19. For example, the transceiver(s) 2014 may include the one or more transceivers 1916 and 1926 and/or the one or more antennas 1918 and 1928 of FIG. 19. The control unit 2020 is electrically connected to the communication unit 2010, the memory 2030, and the additional components 2040 and controls overall operation of the wireless devices. For example, the control unit 2020 may control an electric/mechanical operation of the wireless device based on programs/code/commands/information stored in the memory unit 2030. The control unit 2020 may transmit the information stored in the memory unit 2030 to the exterior (e.g., other communication devices) via the communication unit 2010 through a wireless/wired interface or store, in the memory unit 2030, information received through the wireless/wired interface from the exterior (e.g., other communication devices) via the communication unit 2010.

The additional components 2040 may be variously configured according to types of wireless devices. For example, the additional components 2040 may include at least one of a power unit/battery, input/output (I/O) unit, a driving unit, and a computing unit. The wireless device may be implemented in the form of, without being limited to, the robot (10000a of FIG. 18), the vehicles (10000b-1 and 10000b-2 of FIG. 18), the XR device (10000c of FIG. 18), the hand-held device (10000d of FIG. 18), the home appliance (10000e of FIG. 18), the IoT device (10000f of FIG. 18), a digital broadcast terminal, a hologram device, a public safety device, an MTC device, a medicine device, a fintech device (or a finance device), a security device, a climate/environment device, the AI server/device (40000 of FIG. 18), the BSs (20000 of FIG. 18), a network node, etc. The wireless device may be used in a mobile or fixed place according to a use-example/service.

In FIG. 20, the entirety of the various elements, components, units/portions, and/or modules in the wireless devices 1910 and 1920 may be connected to each other through a wired interface or at least a part thereof may be wirelessly connected through the communication unit 2010. For example, in each of the wireless devices 1910 and 1920, the control unit 2020 and the communication unit 2010 may be connected by wire and the control unit 2020 and first units (e.g., 2030 and 2040) may be wirelessly connected through the communication unit 2010. Each element, component, unit/portion, and/or module within the wireless devices 1910 and 1920 may further include one or more elements. For example, the control unit 2020 may be configured by a set of one or more processors. As an example, the control unit 2020 may be configured by a set of a communication control processor, an application processor, an Electronic Control Unit (ECU), a graphical processing unit, and a memory control processor. As another example, the memory 2030 may be configured by a Random Access Memory (RAM), a Dynamic RAM (DRAM), a Read Only Memory (ROM)), a flash memory, a volatile memory, a non-volatile memory, and/or a combination thereof.

The embodiments described above are implemented by combinations of components and features of the present disclosure in predetermined forms. Each component or feature should be considered selectively unless specified separately. Each component or feature may be carried out without being combined with another component or feature. Moreover, some components and/or features are combined with each other and can implement embodiments of the present disclosure. The order of operations described in embodiments of the present disclosure may be changed. Some components or features of one embodiment may be included in another embodiment, or may be replaced by corresponding components or features of another embodiment. It will be apparent that some claims referring to specific claims may be combined with another claims referring to the other claims other than the specific claims to constitute the embodiment or add new claims by means of amendment after the application is filed.

Embodiments of the present disclosure can be implemented by various means, for example, hardware, firmware, software, or combinations thereof. When embodiments are implemented by hardware, one embodiment of the present disclosure can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

In the case of an implementation by firmware or software, the embodiment of the present disclosure may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the present disclosure may be materialized in other specific forms without departing from the essential characteristics of the present disclosure. Accordingly, the detailed description should not be construed as being limitative, but should be construed as being illustrative from all aspects. The scope of the present disclosure should be determined by reasonable analysis of the attached claims, and all changes within the equivalent range of the present disclosure are included in the scope of the present disclosure.

INDUSTRIAL APPLICABILITY

The present disclosure has been illustrated as being applied to the 3GPP LTE/LTE-A/NR system, but may be applied to various wireless communication systems in addition to the 3GPP LTE/LTE-A/NR system.

The invention claimed is:
1. A method of transmitting, by a user equipment (UE), a physical uplink control channel (PUCCH) in a wireless communication system, the method comprising:
   receiving, from a base station (BS), configuration information for beam failure detection and beam failure recovery through RRC signaling;
   receiving, from the BS, a reference signal (RS);
   transmitting, to the BS, a physical random access channel (PRACH) for a beam failure recovery (BFR) based on a beam failure being detected on the RS, wherein the PRACH is associated with a new beam RS having a reception quality equal to or greater than a predetermined threshold;
   receiving, from the BS, downlink control information (DCI) in a BFR search space in which a response for the PRACH is searched; and
   transmitting, to the BS, the PUCCH using the same spatial filter as a spatial filter for a PRACH transmission on the same cell as the PRACH transmission based on a reception of the DCI.

2. The method of claim 1,
wherein the PUCCH is transmitted on the same component carrier (CC) or the same bandwidth part (BWP) as a CC or BWP that transmits the PRACH.

3. The method of claim 1,
wherein the transmitting of the PRACH to the BS comprises:
counting the number of times of a beam failure for the RS received at least once, wherein the number of times are a number when reception quality of the RS received at least once is equal to or lower than a predetermined reference value; and
transmitting a PRACH for a BFR request (BFRQ) related with the new beam RS having the reception quality equal to or higher than the predetermined threshold based on the configuration information, based on the number of times of beam failure being equal to or greater than a predetermined value.

4. The method of claim 1,
wherein the PUCCH is transmitted using some of a plurality of predetermined resources, and
wherein the some resources are configured based on capability of the UE or configured by indication information received from the BS.

5. The method of claim 1,
wherein the DCI comprises a sounding reference signal (SRS) trigger request.

6. The method of claim 1,
wherein the PUCCH includes HARQ-ACK/NACK information for the DCI.

7. The method of claim 6,
wherein a format of the DCI is a DCI format 1_0, or a DCI format 1_1.

8. The method of claim 1,
wherein, based on multiple PRACHs for the BFR being transmitted, the PRACH is the most recently transmitted PRACH among the multiple PRACHs.

9. The method of claim 8,
wherein a format of the DCI is DCI format 0_0 or DCI format 0_1.

10. A user equipment (UE) configured to transmit a physical uplink control channel (PUCCH) in a wireless communication system, the UE comprising:
at least one transceiver; and
at least one processor functionally connected to the at least one transceiver,
wherein the at least one processor is configured to:
receive, from a base station (BS), configuration information for beam failure detection and beam failure recovery through RRC signaling;
receive, from the BS, a reference signal (RS);
transmit, to the BS, a physical random access channel (PRACH) for a beam failure recovery (BFR) based on a beam failure being detected on the RS, wherein the PRACH is associated with a new beam RS having a reception quality equal to or greater than a predetermined threshold;
receive, from the BS, downlink control information (DCI) in a BFR search space in which a response for the PRACH is searched; and
transmit, to the BS, the PUCCH using the same spatial filter as a spatial filter for a PRACH transmission on the same cell as the PRACH transmission based on a reception of the DCI.

11. The UE of claim 10,
wherein the PUCCH is transmitted on the same component carrier (CC) or the same bandwidth part (BWP) as a CC or BWP that transmits the PRACH.

12. The UE of claim 10,
wherein the at least one processor is further configured to:
count the number of times of a beam failure for the RS received at least once, wherein the number of times are a number when reception quality of the RS received at least once is equal to or lower than a predetermined reference value, and
transmit a PRACH for a BFR request (BFRQ) related with the new beam RS having the reception quality equal to or higher than the predetermined threshold, based on the number of times of beam failure being equal to or greater than a predetermined value.

13. The UE of claim 10,
wherein the PUCCH is transmitted using some of a plurality of predetermined resources, and
the some resources are configured based on capability of the UE or configured by indication information received from the BS.

14. The UE of claim 10,
wherein the DCI comprises a sounding reference signal (SRS) trigger request.

15. The UE of claim 10,
wherein the PUCCH includes HARQ-ACK/NACK information for the DCI.

16. The UE of claim 15,
wherein a format of the DCI is a DCI format 1_0, or a DCI format 1_1.

17. The UE of claim 10,
wherein, based on multiple PRACHs for the BFR being transmitted, the PRACH is the most recently transmitted PRACH among the multiple PRACHs.

18. The UE of claim 17,
wherein a format of the DCI is DCI format 0_0 or DCI format 0_1.

19. A method of receiving, by a base station (BS), a physical uplink control channel (PUCCH) in a wireless communication system, the method comprising:
transmitting, to a user equipment (UE), configuration information for beam failure detection and beam failure recovery;
transmitting, to the UE, a reference signal (RS);
receiving, from the UE, a physical random access channel (PRACH) for a beam failure recovery (BFR) based on a beam failure being detected on the RS, wherein the PRACH is associated with a new beam RS having a reception quality equal to or greater than a predetermined threshold;
transmitting, to the UE, downlink control information (DCI) in a BFR search space in which a response for the PRACH is searched; and
receiving, from the UE, the PUCCH, wherein the PUCCH is transmitted using the same spatial filter as a spatial filter for a PRACH transmission on the same cell as the PRACH transmission by the UE.

* * * * *

UNITED STATES PATENT AND TRADEMARK OFFICE
CERTIFICATE OF CORRECTION

| | | |
|---|---|---|
| PATENT NO. | : 10,903,892 B2 | Page 1 of 1 |
| APPLICATION NO. | : 16/785297 | |
| DATED | : January 26, 2021 | |
| INVENTOR(S) | : Jiwon Kang and Suckchel Yang | |

It is certified that error appears in the above-identified patent and that said Letters Patent is hereby corrected as shown below:

In the Claims

In Column No. 46 Line No. 65, in Claim No. 1, delete "the" and insert -- a --;

In Column No. 48, Line No. 2, in Claim No. 10, delete "the" and insert -- a --;

In Column No. 48, Line No. 59, in Claim No. 19, after transmission on delete "the" and insert -- a --.

Signed and Sealed this
Fifteenth Day of November, 2022

*Katherine Kelly Vidal*

Katherine Kelly Vidal
*Director of the United States Patent and Trademark Office*